(12) United States Patent
Brandt

(10) Patent No.: US 8,478,373 B2
(45) Date of Patent: Jul. 2, 2013

(54) OPTICAL ELEMENT AND APPARATUS COMPRISING TRANSPARENT SUPERCONDUCTING MATERIAL

(75) Inventor: Daniel Brandt, Leicester (GB)

(73) Assignee: Astrium Limited, Hertfordshire (GB)

( * ) Notice: Subject to any disclaimer, the term of this patent is extended or adjusted under 35 U.S.C. 154(b) by 0 days.

(21) Appl. No.: 12/937,133

(22) PCT Filed: Apr. 9, 2009

(86) PCT No.: PCT/GB2009/000937
§ 371 (c)(1),
(2), (4) Date: May 13, 2011

(87) PCT Pub. No.: WO2009/125192
PCT Pub. Date: Oct. 15, 2009

(65) Prior Publication Data
US 2011/0287940 A1    Nov. 24, 2011

(30) Foreign Application Priority Data
Apr. 10, 2008   (GB) .................................. 0806470.1

(51) Int. Cl.
*H01J 40/00* (2006.01)
(52) U.S. Cl.
USPC ....................................................... 505/181
(58) Field of Classification Search
USPC ............................................... 505/181, 182
See application file for complete search history.

(56) References Cited

U.S. PATENT DOCUMENTS 5,110,792 A    5/1992   Nakayama et al.
5,568,302 A    10/1996  Puzey

OTHER PUBLICATIONS

Aragon et al., "Polarizability and Kerr Constant of Proteins by Boundary Element Methods" Colloids and Surfaces B: Biointerfaces, (2007), vol. 56, pp. 19-25.
Bourgeois et al., "Inverse Proximity Effect in a Strongly Correlated Electron System" Physical Review Letters, (2002), vol. 88, No. 18, pp. 186403-1-186403-4.
Fushman et al., "Controlled Phase Shifts with a Single Quantum Dot" Science, (2008), vol. 320, Issue 5877, pp. 769-772.
Granqvist et al., "Transparent and Conducting ITO Films: New Developments and Applications" Thin Solid Films, (2002), vol. 411, pp. 1-5.
Hecht E., Induced Optical Effects-Optical Modulators, Chapter 8 Polarization, (2002), Optics, 4th Ed, pp. 368-370.
Mori N., "Superconductivity in Transparent Sn-doped $In_2O_3$ Films" Journal of Applied Physics, (1993), vol. 73, No. 3, pp. 1327-1338.
Osofsky et al., "Enhanced Superconductivity in Metallic Oxides near the Metal-Insulator Transition" Physical Review B, (2002), vol. 66, No. 2, pp. 020502-1-020502-4.
Osofsky et al., "New insight into Enhanced Superconductivity in Metals Near the Metal-Insulator Transition" Physical Review Letters, (2001), vol. 87, No. 19, pp. 197004-1-197004-4.
International Search Report (PCT/ISA/210) dated Apr. 10, 2008.

*Primary Examiner* — Colleen Dunn
(74) *Attorney, Agent, or Firm* — Buchanan Ingersoll & Rooney PC

(57) ABSTRACT

An optical element is disclosed which includes transparent superconductor material.

35 Claims, 21 Drawing Sheets

OPTICAL ELEMENT AND APPARATUS COMPRISING TRANSPARENT SUPERCONDUCTING MATERIAL

The present invention relates to optical apparatus and optical elements that may be included in such optical apparatus, and for example relates to the control of refractive indices or dispersions of such optical elements in order to provide desired optical effects.

The routing of light through optical apparatus and the dispersion, focussing, reflection or transmission of the light by the optical elements, such as prisms, lenses and gratings, within the apparatus generally depends on the refractive indices of the various optical elements and how they are arranged relative to one another.

The optical characteristics, including the refractive index at a given wavelength, of each optical element is usually fixed, and in order to obtain desired optical effects or routings, optical elements having desired characteristics must be selected and the various optical elements must be precisely positioned and aligned relative to one another. In order to vary optical paths or effects, optical elements may have to be exchanged for other optical elements having different characteristics, or movement of optical elements may be required, which in turn require precise and stable motors and mechanisms for moving the optical elements.

Furthermore, the degree by which one can distinguish different wavelengths is quantified by the resolving power of the optical element or system. The resolving power provides a measure of the colour resolution of the system. In the case of gratings and prisms the resolving power depends on the physical size of the device and on its dispersion. The dispersion of a conventional glass prism is of order $85000 \, m^{-1}$, and in order to obtain high resolving powers a prism having a large physical size is required.

At present, ultra-high resolving powers, for instance greater than 100,000, are only available to a small number of specialised institutes. For example, the Echelle spectrograph at the national Institute of Standards (NIST) in the United States provides resolving powers of up to the order of 1,000,000, but it is 10.7 meters long and more than 1.5 meters high.

Transparent conductors have been used in display-related applications, in particular in the production of display screens. In one example, transparent conductors are used in LED display screens as they enable the provision of control circuitry that is largely transparent and does not block the passage of light produced by the LEDs. Similarly, transparent conductors may be used to form circuitry in solar cells, so that electromagnetic radiation can pass through the circuitry and be absorbed by the active material of the cells, thus increasing efficiency. However, transparent conductive material is not used to form optical elements providing desired optical effects or routings.

There are two different main types of transparent conductors: either a succession of very thin metal layers, such as Ag, Au or Cu separated by transparent films, or wide-bandgap oxide semiconductors. One example of the second type of transparent conductive material is indium tin oxide (ITO). It has been reported in, for instance, Mori, Journal of Applied Physics, 73, 1327 (1992) in a study of ITO deposition processes that at low temperatures, ITO becomes superconducting. The optical properties of the ITO material in the superconducting state were not considered.

It is an aim of the present invention to provide improved, or at least alternative, optical apparatus, optical elements or methods.

In a first, independent aspect there is provided an optical element comprising transparent superconductor material.

By forming an optical element using transparent superconductor material, an element having a high dispersion in a waveband of interest may be provided. The dispersion may diverge in the region of a critical wavelength, $\lambda_{crit}$. Furthermore, there may be provided an optical element that has a wavelength-dependent refractive index that varies with a physical parameter, such as temperature or magnetic field. The optical element therefore may provide optical properties that may be used in a variety of applications that benefit from a large, variable and controllable refractive index.

By transparent superconductor material is meant material that, in at least one part of the superconducting phase, is at least partially transparent to electromagnetic radiation at least one wavelength or range of wavelengths. The electromagnetic radiation may comprise visible light.

Effects described herein may arise from the loss of U(1) phase rotational symmetry due to the existence of a macroscopic wavefunction representing Cooper pairs present in the superconducting state, as discussed in the theoretical section below. The superconducting state or phase is taken as being a state or phase in which a macroscopic wavefunction representing the superconducting charge carriers exists. The transition to a zero electrical resistance state associated with the superconducting state generally has a finite width, and electrical resistance can persist into the superconducting state due to a variety of effects. Thus, references to the superconducting state or phase herein should not be considered to be limited to a state or phase of zero electrical resistance.

The transparent superconducting material may be arranged on an optical axis of the optical element. The transparent superconducting material may be formed to provide at least one desired optical property in the superconducting state. The at least one desired optical property may comprise a transmissive, reflective, dispersive or refractive property.

The transparent superconductor material may be shaped to provide desired optical characteristics. The transparent superconductor material may be shaped to provide at least one desired optical characteristic in the superconducting state.

The transparent superconductor material may be formed to have at least one desired electronic property. The at least one desired electronic property may be a desired electronic property in the superconducting state. The at least one desired electronic property may comprise a desired value or range of values for at least one of: —a superconducting charge carrier concentration; a variation of the superconducting charge carrier concentration with temperature, pressure or magnetic field; a superconducting energy gap; a critical temperature, field or wavelength; or a transparent band gap.

The transparent superconductor material may be formed so that in at least one region of the superconducting state, the superconducting critical wavelength is within a transparent band gap of the transparent superconductor material.

The transparent superconductor material may be a layer of superconductor material of variable thickness. The layer of transparent superconductor material may have a wedge-shaped profile.

The optical element may comprise a substrate, and may have a layered structure.

The superconductor material may be deposited on the substrate directly, or may be deposited on at least one intermediate layer. The substrate may comprise, for example, glass or polyester. The substrate may comprise achromatic lens glass. The use of achromatic lens glass may minimize optical effects introduced by the substrate.

The optical element may further comprise a metallic layer in contact with the transparent superconductor material. If the metallic layer comprises a metal having a strongly correlated electron wavefunction, such as silver, then the metallic layer may provide an inverse proximity effect in which the superconducting transition temperature and/or superconducting critical magnetic field of the transparent superconductor material is increased, for instance associated with increased charge carrier concentration.

Alternatively, the metallic layer may comprise other metals that provide a proximity effect, rather than an inverse proximity effect, and that thus reduce the charge carrier concentration in the transparent superconductor material. Such a metallic layer may be used to tune the transparent superconductor material to have desired characteristics for a given application. The use of a metallic layer providing a proximity effect may be used, for example, to provide improved stability.

The transparent superconductor material may comprise or be formed from a wide band gap semiconducting material. The transparent superconductor material may be formed by annealing or doping the wide band gap semiconducting material.

The annealing may comprise annealing in an air atmosphere and/or at a temperature substantially equal to 140° C. The annealing may comprise annealing at a temperature in a range between 120° C. and 160° C.

The transparent superconductor material may comprise, or be formed from, a metal oxide material. The metal oxide material may be a doped metal oxide material. The superconductor material comprises a mixture of at least two metal oxide materials.

The superconductor material may be an intermetallic material, for example an oxide intermetallic material.

The transparent superconductor material may comprise at least one of a titanium oxide material, a zinc oxide material, a cadmium oxide material, an indium oxide material, a tin oxide compound, a fluoro-oxide material, and a molybdenum oxide material.

The superconductor material may comprise Indium Tin Oxide (ITO or InO:Sn). The superconductor material may comprise at least one of $Ti_{1-x}Nb_xO_2$, $Cd_{1-x}Y_xSb2O_6$, $SnO_2$:F, ZNO:Al, $Cd_2SnO4$, and $In_4Sn_3O_2$.

Alternatively, the superconductor material may comprise a high $T_c$ superconductor material. The high $T_c$ superconductor material may comprise a Tl-, Ba- or Hg-based compound, such as $Tl_2Ba_2Ca_2Cu_2O_8$, which is either doped or undoped. Liquid He cooling techniques may not be necessary for at least some high $T_C$ superconducting materials, and instead liquid $N_2$ cooling techniques or single stage pulse tube coolers or sterling coolers may be used.

The optical element may be a prism, lens, switch, beamsplitter, router, filter, laser device, non-linear device or logic gate.

The optical element may be etalon or an interferometer. The optical element may be configured such that in operation electromagnetic radiation is reflected at least one boundary of the transparent superconductor material. The electromagnetic radiation may be reflected from each boundary of the transparent superconductor material. The optical element may comprise at least two reflective layers, and the transparent superconductor material may be located between the at least two reflective layers. Alternatively, reflection may be obtained from a mismatch in refractive index between the transparent superconductor material and its surroundings, for instance air or vacuum, and/or a mismatch in refractive index between the transparent superconductor material and the or a substrate.

The optical element may comprise an array of prisms each comprising transparent superconducting material. The array may be a one dimensional or two dimensional array. The array may be a periodic array. The array of prisms may form a Fresnel prism.

The optical element may further comprise at least two reflective layers, and the transparent superconducting material may be positioned between the at least two reflective layers.

The optical element may further comprise a resonant cavity and the transparent superconducting material may be positioned in the resonant cavity.

The transparent superconducting material may be formed and arranged to provide a magneto-optic effect in the superconducting state.

The transparent superconductor material may be formed and arranged to provide a medium for transmission or reflection of electromagnetic radiation in the superconducting state. The optical element may be formed and arranged so that the transparent superconductor material in the superconducting state provides at least one effect on the electromagnetic radiation. The effect may be at least one of a magneto-optic effect, a non-linear effect and a Kerr effect.

The transparent superconducting element may be formed and arranged to be operable in the superconducting state as a non-linear medium. The transparent superconducting material may be formed and arranged to be operable in the superconducting state as a Kerr medium.

In a further independent aspect there is provided optical apparatus comprising at least one optical element.

The optical element may be provided on an optical axis of the apparatus.

The optical apparatus may further comprise means for controlling at least one of the refractive index and the dispersion of the transparent superconductor material. The optical apparatus may comprise control means for controlling at least one property of the transparent superconductor material in the superconducting state. The at least one property may comprise the superconducting charge carrier concentration of the transparent superconductor material of the or each optical element in the superconducting state. The control means may thereby control at least one of the refractive index and the dispersion of the transparent superconductor material.

The apparatus may comprise a control system for controlling at least one physical parameter to which the transparent superconductor material is subject and/or controlling at least one property of electromagnetic radiation provided to the transparent superconductor material. The control system may comprise at least one of a temperature controller, a thermometer, heater and cooling device. Alternatively or additionally the control system may comprise at least one of a magnetic field source, magnetic shielding and control circuitry. Alternatively or additionally, the control system may comprise at least one of a pressure source, pressure cell and control circuitry. Alternatively or additionally the control circuitry may comprise at least one of a source of electromagnetic radiation, a controller for controlling operation of the source, and one or more optical elements arranged on an optical axis of the apparatus and arranged to control or select at least one property of electromagnetic radiation provided to or output from the transparent superconducting material. The control means may comprise the control system.

The or a control means may be configured to control the temperature of the transparent superconductor material and/or the magnetic field to which the transparent superconductor material is subject.

The or a control means may be configured to control the pressure to which the transparent superconductor material is subject.

The refractive index and dispersion of the transparent superconducting material in the superconducting state is usually strongly wavelength dependent, and the means for controlling the refractive index and/or dispersion of the transparent superconductor material may be configured to control the refractive index or dispersion to have at least one desired characteristic at least one wavelength or range of wavelengths. The means for controlling refractive index may be configured to control $\lambda_{crit}$.

The control means may be configured to control whether electromagnetic radiation of a pre-determined wavelength or wavelengths is reflected, transmitted or absorbed.

The control means may be configured to control the path of electromagnetic radiation following interaction with the transparent superconductor material. The control means may be configured so as to control the path of electromagnetic radiation having a predetermined wavelength or range of wavelengths.

The control means may be configured so as to route received electromagnetic radiation to a pre-determined destination. Thus, a desired routing may be achieved without needing to convert optical signals into electrical signals and back into optical signals. Thus, the quantum state of the photon or photons making up the optical signal may be preserved, thus providing quantum non-demolition routing.

The optical apparatus may further comprise a detector, for detecting electromagnetic radiation from the at least one optical element. The detector may comprise a detector array.

The apparatus may further comprise means for monitoring change in refractive index or dispersion of the superconductor material. Alternatively or additionally the apparatus may comprise means for receiving electromagnetic radiation of a predetermined wavelength or range of wavelengths from the at least one optical element and means for monitoring variation in the received electromagnetic radiation, for instance the position of the received electromagnetic radiation on a detector array.

The control means may be configured to control both at least one property of electromagnetic radiation applied to the transparent superconductor material and the at least one property of the transparent superconductor material in the superconducting state thereby to provide a non-linear response. The non-linear response may comprise a magneto-optic optical response.

The control means may be configured to control both at least one property of electromagnetic radiation applied to the transparent superconductor material and the at least one property of the transparent superconductor material in the superconducting state thereby to generate ultrashort light pulses, or to provide Kerr mode locking, or to provide self-focussing, or to provide super-continuum generation.

The optical apparatus may comprise a radiation source for applying electromagnetic radiation to the at least one optical element.

The optical apparatus may further comprise means for applying electromagnetic radiation to at least one of the optical elements, and the means for applying electromagnetic radiation may be configured to control applied electromagnetic radiation to be such that it alters the refractive index of the transparent superconductor material.

The means for applying electromagnetic radiation may be configured to control the intensity and/or frequency or wavelength of the applied electromagnetic radiation. The means for applying electromagnetic radiation may be configured to control the electromagnetic radiation to have a desired magnetic field component.

The means for applying electromagnetic radiation may be configured to apply electromagnetic radiation of at least a first intensity or a second intensity, and the electromagnetic radiation of second intensity may have a magnetic field component that alters the refractive index of the transparent superconductor material such that the electromagnetic radiation of second intensity follows a different path to the electromagnetic radiation of first intensity following interaction with the transparent superconductor material.

The means for applying electromagnetic radiation may comprise at least two optical inputs, which may be arranged such that in operation electromagnetic radiation from the at least two optical inputs is combined and provided to the optical element or at least one of the optical elements. In operation, one, both or neither of the inputs may provide electromagnetic radiation. The means for applying electromagnetic radiation may be configured to operate such that electromagnetic radiation from either one of the optical inputs considered alone has an intensity less than or equal to the first intensity and such that electromagnetic radiation from both of the inputs combined has an intensity greater than or equal to the second intensity. Thus, the optical apparatus may be configured to perform logical operations on the optical inputs.

The electromagnetic radiation of first intensity may be reflected from the transparent superconductor material and the electromagnetic radiation of second intensity may be transmitted by the transparent superconductor material.

The optical apparatus may be one of: —a spectrometer; an optical router; an interferometer; a temperature, magnetic field or pressure sensor; an optical processor or computer; a laser; a laser line narrowing device; a filter; a beam splitter; a laser beam steerer; a customisable optical bench; a non-linear device; an ultrashort light pulse generator; a Kerr mode locking device; a self-focussing device; a super-continuum generation device or a monochromator.

In a further independent aspect there is provided a method of controlling electromagnetic radiation, comprising cooling transparent superconductor material to the superconducting state; controlling at least one property of the transparent superconductor material so that it has at least one desired optical characteristic and applying electromagnetic radiation to the transparent superconductor material.

Controlling the at least one property of the transparent superconductor material may comprise controlling the superconducting charge carrier concentration of the transparent superconductor material in the superconducting state, which may thereby control at least one of the refractive index and the dispersion of the transparent superconductor material.

Controlling the at least one property of the transparent superconductor material may comprise controlling the temperature of the transparent superconductor material, or controlling the magnetic field to which the transparent superconductor material is subject.

Alternatively or additionally, controlling the at least one property of the transparent superconductor material may comprise controlling the pressure to which the transparent superconductor material is subject.

The at least one property of the transparent superconductor material may be controlled, for example by controlling the temperature, pressure or magnetic field, such as to direct electromagnetic radiation of at least one pre-determined wavelength or range of wavelengths to a pre-determined destination.

The method may further comprise controlling the magnetic field component of electromagnetic radiation applied to the superconductor material to be such that it alters the refractive index of the transparent superconductor material.

The method may further comprise selecting at least one property of electromagnetic radiation applied to the transparent superconductor material in the superconducting state and controlling the superconductor charge carrier concentration of the transparent superconductor material in the superconducting state thereby to provide a magneto-optic optical response.

The method may further comprise selecting at least one property of electromagnetic radiation applied to the transparent superconductor material in the superconducting state and controlling the superconductor charge carrier concentration of the transparent superconductor material in the superconducting state to provide a non-linear optical response.

The method may further comprise selecting at least one property of electromagnetic radiation applied to the transparent superconductor material in the superconducting state and controlling at least one property of the transparent superconductor material in the superconducting state to generate ultrashort light pulses, to provide Kerr mode locking, to provide self-focussing, or to provide super-continuum generation.

The at least one property may comprise the superconducting charge carrier concentration.

In a further independent aspect, there is provided a sensor for sensing variation of at least one physical parameter, comprising means for directing electromagnetic radiation to transparent superconductor material subject to the at least one physical parameter, means for monitoring variation in the electromagnetic radiation following interaction with the transparent superconductor material, and means for determining a variation of the least one physical parameter in dependence on the variation of the electromagnetic radiation.

The variation may comprise variation in position of electromagnetic radiation on a detector array and/or variation in intensity and/or wavelength.

By suitable calibration, any change in at least one physical parameter to which the transparent superconductor material is subject may be monitored. The at least one physical parameter may comprise temperature, pressure or magnetic field. The sensor may be, for example, a bolometer, thermometer, pressure sensor or magnetic field sensor.

The apparatus may be configured to operate in the superconducting state, close to the superconducting transition, where refractive index varies strongly with temperature, pressure or magnetic field, thus providing a sensitive temperature, pressure or magnetic field meter.

In a further independent aspect of the invention there is provided a method of sensing variation of at least one physical parameter, comprising directing electromagnetic radiation to transparent superconductor material subject to the at least one physical parameter, monitoring variation of the electromagnetic radiation following interaction with the transparent superconductor material, and determining a variation of the least one physical parameter in dependence on the variation in the electromagnetic radiation.

The at least one physical parameter may be temperature, pressure or magnetic field.

In another independent aspect of the invention there is provided a bolometer comprising transparent superconductor material.

In a further independent aspect of the invention there is provided a delay device for delaying electromagnetic radiation comprising transparent superconductor material and means for directing the electromagnetic radiation through the transparent superconductor material.

In another independent aspect of the invention there is provided a method of slowing electromagnetic radiation, comprising passing the electromagnetic radiation through transparent superconductor material.

In another independent aspect of the invention there is provided a method of producing an optical element comprising providing transparent superconductor material in a desired form on an optical axis of the optical element.

The method may comprise shaping the transparent superconductor material to provide desired optical characteristics.

The method may comprise forming the transparent superconductor material to have at least one desired electronic property in the superconducting state.

The method may comprise forming the transparent superconductor material so that in at least one region of the superconducting state, the superconducting critical wavelength is within a transparent band gap of the transparent superconductor material.

The method may comprise depositing the transparent superconductor material on a substrate.

The method may comprise controlling the level of oxygen provided during deposition of the transparent superconductor material, thereby to control the electrical and/or material properties of the transparent superconductor material.

The method may comprise controlling the stoichiometry of the transparent superconductor material thereby to control the electrical and/or material properties of the transparent superconductor material.

The method may comprise annealing the transparent superconductor material.

The method may comprise providing a metallic layer in contact with the transparent superconductor material.

The transparent superconductor material may comprise, or be formed from, a wide band gap semiconducting material. The transparent superconductor material may comprise, or be formed from, a metal oxide material. The transparent superconductor material may comprise at least one of a titanium oxide material, a zinc oxide material, a cadmium oxide material, an indium oxide material, a tin oxide compound, a fluoro-oxide material, and a molybdenum oxide material. The transparent superconductor material may comprise intermetallic material. The transparent superconductor material may comprise Indium Tin Oxide (ITO).

The method may comprise forming the optical element to be operable as at least one of a prism, lens, switch, beam-splitter, router, filter, etalon, interferometer, laser device, non-linear device or logic gate.

In a further independent aspect, there is provided an optical element configured to operate such that non-zero photon rest mass electromagnetism effects occur within the optical element, associated with gauge invariance breaking within a superconductor material.

In another independent aspect there is provided an optical element substantially as described herein, with reference to the accompanying drawings.

In a further independent aspect there is provided apparatus substantially as described herein, with reference to the accompanying drawings.

In another independent aspect there is provided a method substantially as described herein, with reference to the accompanying drawings.

Any feature in one aspect of the invention may be applied to another aspect of the invention, in any appropriate combination. In particular, apparatus features may be applied to method features and vice versa.

Preferred features of embodiments of the invention will now be described, purely by way of example, and with reference to the accompanying drawings in which:—

It has been found, pursuant to the present invention, that transparent superconductor materials in the superconducting state can provide dispersions that are many times higher than conventional materials.

As will be described in more detail below, light travels much more slowly in the transparent superconductor material, when in the superconducting state, than in vacuum, as quantified by the refractive index. Conventional materials reach refractive indices of ~5-6, whilst at least some of the transparent superconductor materials described herein reach refractive indices of higher than 500 in the superconducting state, in practice. Even higher refractive indices are achievable with transparent superconductor materials, given increased accuracy of control of temperature and magnetic field and increased control over the wavelength of incident electromagnetic radiation.

The refractive index provides a measure of the angle through which light changes its path when entering a material. The fraction of light reflected from the surface of a material is dependent on the refractive index. A high refractive index corresponds to a large change in direction or a large fraction of reflected light.

It has been found, pursuant to the present invention, that extremely high dispersions, and consequently extremely high resolving powers, may be provided by transparent superconducting materials over a narrow waveband determined by the attributes of the superconducting material, and that the active waveband can be controlled, either by controlling characteristics of the material or controlling physical parameters, such as temperature, pressure and magnetic field to which the material is subject. Thus, optical properties of the material can be controlled. Away from the active waveband, light can pass through the material almost unhindered. That allows for optical components which may be controlled selectively to be transparent, reflect a predetermined fraction of the light (for instance to provide beam-splitting) or alter its course.

Various embodiments are described below that use the dispersion properties of transparent superconductor materials to provide optical elements and apparatus having various different applications. The theoretical basis for the dispersion properties of the transparent superconductor material is also described.

Figure 1:
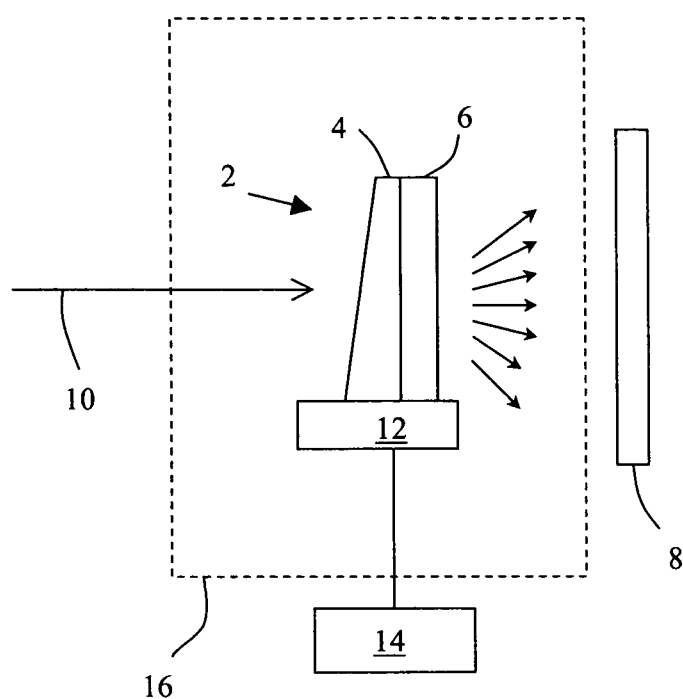
FIG. 1 is a schematic diagram of a prism according to the preferred embodiment.

A prism 2 according to the preferred embodiment is shown in FIG. 1. The prism comprises a layer of indium tin oxide (ITO) 4 deposited on a glass or polyester transparent substrate 6. In the example shown, the substrate is an achromatic lens glass substrate. The prism is aligned with a detector array 8, comprising an array of CCD or CMOS detector elements. The prism 2 is mounted on a thermal mass 12, which includes thermometer and heater circuitry (not shown) controlled by controller 14.

Any suitable thermometer and heater circuitry may be used. Commonly available commercial temperature controllers can provide control to the 500 μK level. Alternatively, temperature controllers that provide control with an accuracy of 0.2 μK may be used, for instance as described in arXiv: cond-mat/0305469v2, 2003. Further thermal stability may be provided by increasing the thermal mass.

The prism 2 and the thermal mass are within a cooling device 16, in this case a dilution refrigerator, or pumped $He^4$ refrigerator.

The thermometer and heater circuitry, temperature control techniques, and cooling devices used depend in practice on the temperature range of operation, which in turn depends on the superconducting transition temperature of the transparent superconductor material. For high $T_c$ superconductor materials liquid nitrogen cooling may be used, for example.

The prism may also be located inside magnetic shielding (not shown), depending on the level of sensitivity required of the apparatus. The magnetic shielding may be, for instance, mu-metal and/or cryoperm shielding, and may provide shielding down to the nT level. In addition, a superconducting solenoid magnet may be provided, inside the shielding, to apply a desired magnetic field.

The prism is shaped to provide desired optical characteristics. In this case, the prism has a slanted front face, and has a thickness of around 100 μm.

The transparent superconducting layer can be formed by any suitable method for forming layered structures, including any suitable sputtering and vapour deposition method.

In order to achieve an ITO film that will undergo a superconducting transition, it is desirable that the film is deposited to achieve a desired disorder parameter. The disorder parameter determines whether the low temperature behaviour of the film is that of a metal or of a semiconductor. In ITO superconductivity can be found near the metal-insulator transition (MIT). The coating produced in ITO deposition processes is not stoichiometric indium tin oxide. The film stability and conductivity are increased by oxygen deficiency introduced in the coating process.

Figure 2:
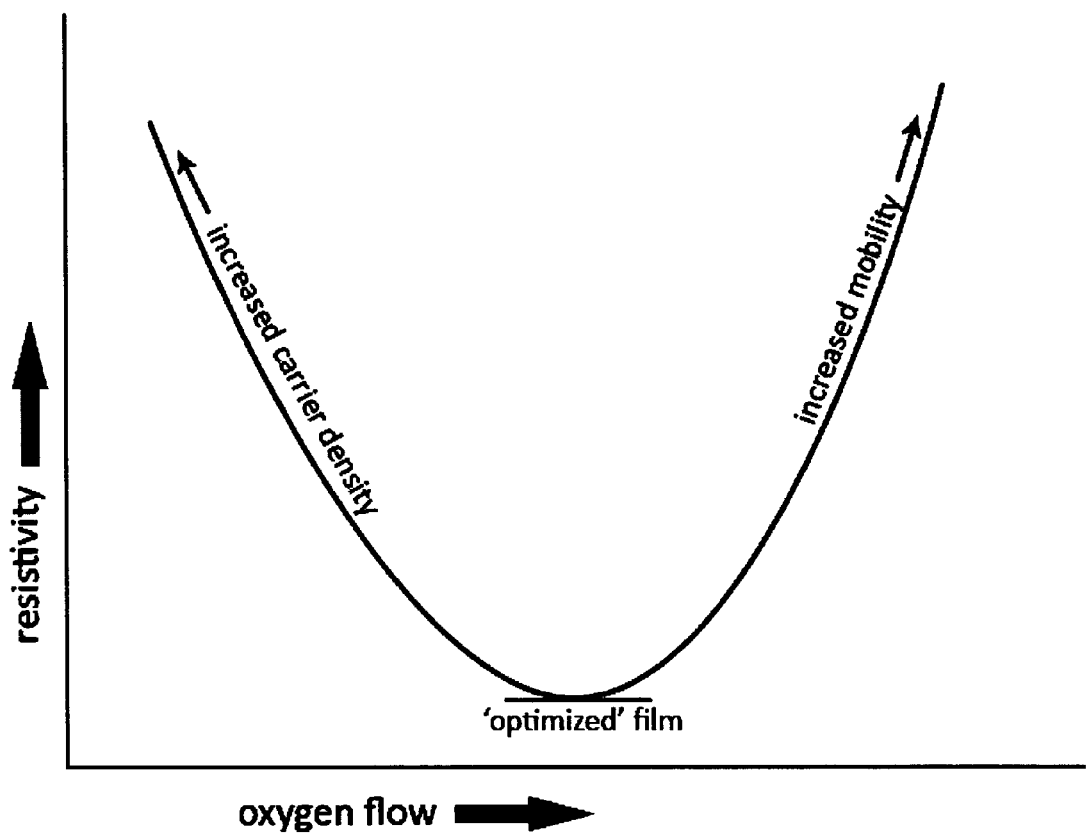
FIG. 2 is a graph of resistivity of an ITO film versus level of oxygen flow during deposition.

The resistivity of a film can be increased by changing the level of oxygen deficiency during the coating process. Increased oxygen deficiency (i.e. decreased oxygen flow during deposition) leads to higher carrier concentrations at lower carrier mobilities while decreased deficiency (increased oxygen flow) leads to lower carrier concentrations and higher mobilities, as illustrated in the graph of FIG. 2. An increased oxygen flow means increased disorder.

As the disorder in a deposited film of a wide band gap conducting oxide increases, its conduction behaviour at low temperatures undergoes a Metal-Insulator Transition (MIT). It has been found that the superconducting transition temperatures of metallic oxide films are significantly enhanced near the MIT (Osofsky et al, Physical Review B, 66, 2002). The distance r from the MIT is defined as:

$$r = \frac{\sigma_{300K}}{\sigma_c} - 1 \quad (1)$$

where $\sigma_{300K}$ is the conductivity at room temperature and $\sigma_c$ is the conductivity at the MIT.

For ITO the critical conductivity is $\sigma c = (67.2 \, \Omega cm)^{-1}$ (Osofsky et al, Physical Review Letters. 87, 2001) and ITO films within a distance $r \approx 5\text{-}10$ go superconducting (Mori, Journal of Applied Physics, 73:1327, 1992). The disorder, and consequently the parameter r can be reduced by low-temperature (~140° C.) post deposition annealing in an air atmosphere.

In the embodiment of FIG. 1, the transparent superconductor material is formed by electron beam or pulsed laser evaporation of the ITO onto the substrate, with low temperature post-deposition annealing in air at around 140° C. for at least 90 to 120 minutes.

The slanted profile shown in FIG. 1 is obtained by selective operation of a moveable shutter between the material source and the target during deposition, or by ion beam milling after deposition. Any other desired profile, or three-dimensional shape for the transparent superconductor material can be obtained using those techniques.

In variants of the embodiments shown in FIG. 1, alternative transparent superconductor material is used in place of the ITO. It has been found that superconductor materials may be formed from materials that are wide band gap semiconductors in the normal state. The wide band gap semiconductor material may be annealed to form a transparent superconductor material.

Examples of alternative materials include $Ti_{1-x}Nb_xO_2$, $Cd_{1-x}Y_xSb2O_6$, $SnO_2:F$, $ZNO:Al$, $Cd_2SnO_4$, and $In_4Sn_3O_2$. Those material may be subject to annealing and/or doping to form transparent superconductor materials. High $T_c$ superconducting materials can also be used, for instance Tl-, Hg- or Bi-based high $T_c$ superconducting materials, such as $Tl_2Ba_2Ca_2Cu_2O_8$.

Superconductors have a refractive index that varies as a function of wavelength of applied electromagnetic radiation, and that diverges as the wavelength approaches a value $\lambda_{crit}$.

Figure 3A:
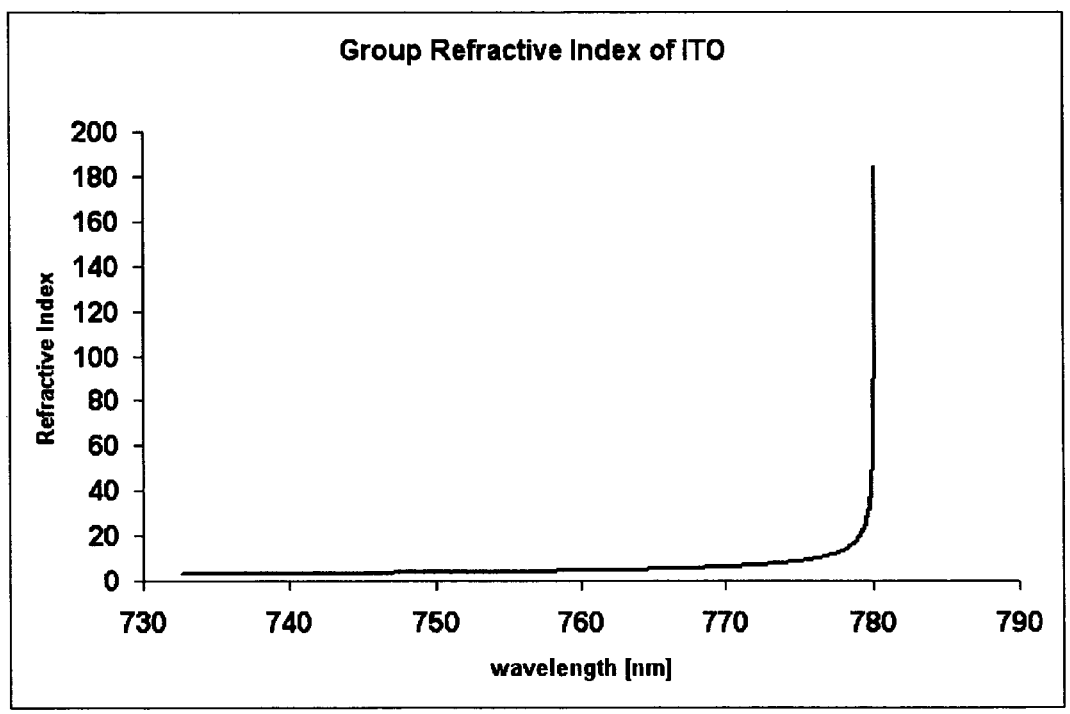
FIG. 3a is a graph of the variation of group refractive index, $n_g$, of ITO as a function of wavelength, $\lambda$.
Figure 3B:
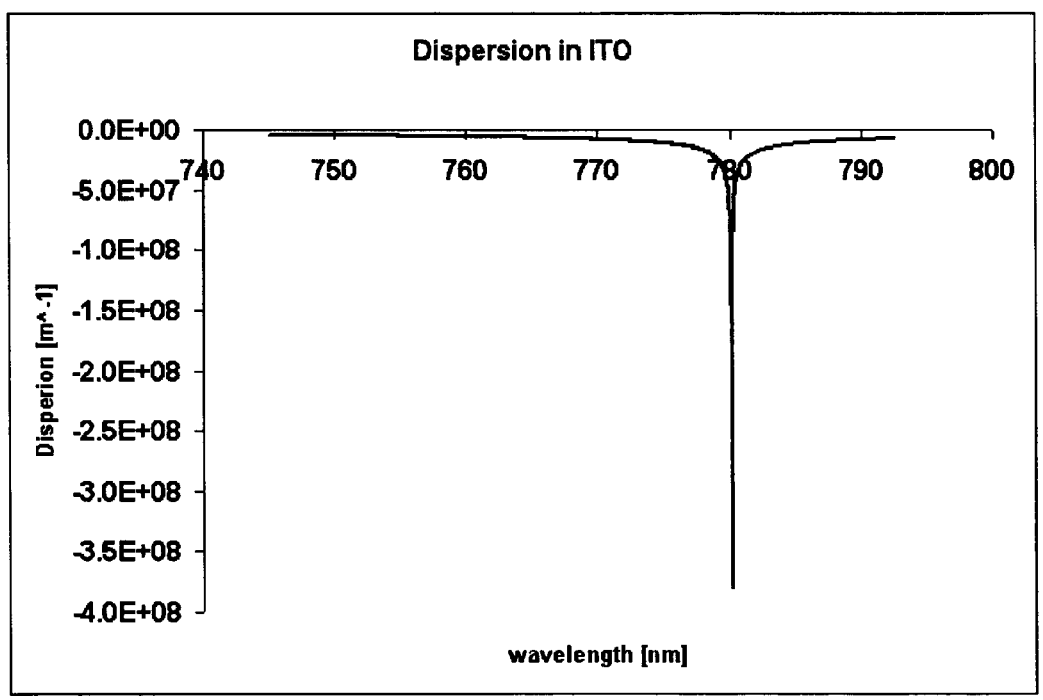
FIG. 3b is a graph of the variation of the dispersion of the ITO of FIG. 2a as a function of wavelength, $\lambda$.

The variation of the group refractive index of ITO with a superconductor carrier concentration of approximately $10^{21}$ cm$^{-3}$, due to gauge invariance breaking, and neglecting the intrinsic group refractive index of the material (of approximately 2) is shown in the graph of FIG. 3a. The dispersion of the ITO material of FIG. 3a due to gauge invariance breaking is plotted versus wavelength in FIG. 3b.

The prism of FIG. 1, and other embodiments described herein, exploit the steep slope of the refractive index and diverging dispersion with wavelength of transparent superconducting materials to provide optical elements that have high resolving powers and/or that may be used to provide, for example, real-time control of refractive indices.

In order to be of most use, the region of strong variation of refractive index with wavelength (approaching $\lambda_{crit}$) coincides, at least partially, with a range of wavelengths for which the material is transparent. It has been shown, for instance in C. G. Granqvist et al, Thin Solid Films 411, 1-5 (2002) in a study of deposition processes that ITO films of thickness 2 µm are transparent in at least the range of wavelengths from around 0.35 µm to around 0.7 µm, and for wider ranges of wavelengths if the carrier concentration is varied. The carrier concentration depends on deposition and annealing processes. Transparency in the superconducting state was not considered In the example shown in FIG. 1, the prism 2 forms part of a spectrometer. As the refractive index diverges strongly with wavelength, the prism 2 is able to provide dispersions that are many times higher than for conventional prisms. For example, dispersions may be obtained in practice that are approximately 10,000 times higher than those of at least some conventional prisms.

In operation, the transparent superconductor material is cooled to below the superconducting transition temperature, $T_c$, and is stabilised at a desired operating temperature using the controller 14 and the heater and thermometer circuitry. Electromagnetic radiation is passed through the prism 2, and refracted so that each wavelength component of the electromagnetic radiation follows a different path and is received at a different point on the detector array 8, enabling measurement of the relative intensity of the different wavelength components of the electromagnetic radiation. Thus, the apparatus of FIG. 1 operates in a similar way to a conventional spectrometer. However, as the dispersion provided by the transparent superconductor material is high, the resolution provided by the spectrometer is also high and can, potentially, provide dispersions that are far higher than are available using conventional prisms.

The refractive index characteristics of the transparent superconductor material in the superconducting state, and thus the resolution and other operating characteristics of the spectrometer, depend strongly on the chosen operating temperature (and on other physical parameters to which the material may be subject, such as magnetic field or pressure).

The value of $\lambda_{crit}$, which determines the wavelengths at which the refractive index diverges is related to the density of superconducting charge carriers, $n_s$, within the material as follows:—

$$\lambda_{crit} \propto n_s^{-1/2} \quad (2)$$

The derivation of equation (2) is provided below.

If it is assumed that the density of superconducting charge carriers in the sample cannot exceed the charge carrier concentration of the normal state, carrier concentration becomes the controlling variable setting the accessible wavelength.

The carrier concentration can be controlled by setting the material parameters, for instance by doping or otherwise varying the proportions of constituents of the material. For any given material, the density of superconducting charge carriers in the superconducting state can be varied by varying the temperature T, magnetic field H, or pressure. Thus, a degree of control over $\lambda_{crit}$ is possible.

In the case of temperature dependence, the density of superconducting charge carriers as a function of temperature is approximated by:—

$$n_s^0(T) = n_s^0(0) \left[ \frac{T_c^0 - T}{T_c^0} \right]^4 \quad (3)$$

where $n_s^0$ is the density of superconducting electrons or holes and $T_c^0$ is the Ginzburg-Landau transition temperature. The superscript 0 indicates zero applied magnetic field.

Thus, by varying the temperature the value of $\lambda_{crit}$ can be increased arbitrarily. The maximum value for the number of superconducting charge carriers is defined by the magnitude of $n_s^0(0)$.

According to Granqvist et al, Thin Solid Films 411, 1-5 (2002), for ITO the carrier concentration can be varied by changing the exact composition and deposition technique. However, the transparent bandwidth seems to reduce with increasing carrier concentration, and thus there is a balance between varying the transparent bandwidth and varying the refractive index properties in the superconducting state.

In a variant of the embodiment of FIG. 1, a coating of silver of thickness around 1 nm is provided on the substrate 6, between the substrate 6 and the transparent superconductor material 4. The silver coating provides an increase in carrier concentration in the transparent superconductor material 4 due to the inverse proximity effect. Other metals that have a strongly correlated electronic wave function may be used in place of silver. The inverse proximity effect is discussed, for instance, in O. Bourgeois et al. Physical Review Letters, 88, 186403-186407 (2002).

As electromagnetic radiation in a narrow waveband above $\lambda_{crit}$ cannot pass the material but instead gets absorbed, the active waveband of transparent superconductor material of suitable thickness can be chosen to provide a selective optical filter, eliminating a narrow waveband from electromagnetic radiation applied to the material. The eliminated waveband may be changed without requiring any moving parts.

The range of useful operating temperatures depends strongly on the chosen application. That is because the stability of the refractive index at any given wavelength close to the critical wavelength increases strongly the closer to T=0, H=0 the critical wavelength is obtained.

For example, in the case of an optical element made from ITO with a carrier concentration of $10^{21}$ m$^{-3}$ and superconducting critical temperature $T_c$=3.5K, at an operating temperature of 100 mK for a system operated at 0.99$\lambda_{crit}$ a variation of 0.1 mK will cause a variation of refractive index of less than 1%. Similarly a variation of magnetic field of 0.1 Gauss will cause a variation in refractive index of approximately 0.1%.

In the case of the embodiment of FIG. 1, used as a spectrometer, it is important to maintain the temperature and magnetic field constant to ensure that the measured spectrum does not vary because of variation in the refractive index properties.

In other embodiments described in more detail below, physical parameters, in particular temperature or magnetic field, are varied intentionally in order to provide desired optical effects, for example switching, routing or mixing.

Figure 4:
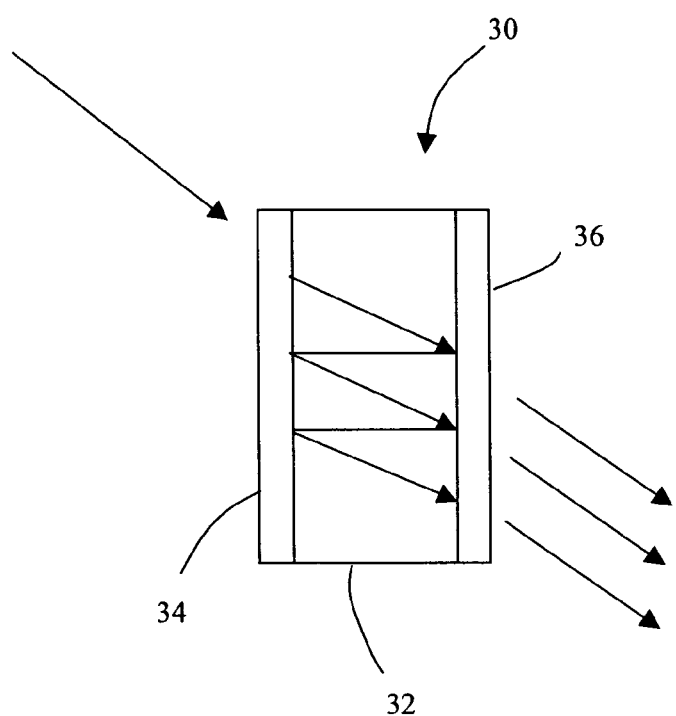
FIG. 4 is a schematic diagram of an etalon or interferometer.

A second embodiment is illustrated in FIG. 4, which shows an etalon or fabry-perot interferometer device 30. The device comprises transparent superconductor material 32 sandwiched between reflective or mirrored layers 34 36. In operation, a portion 38 of the electromagnetic radiation that passes into the device is internally reflected from the boundary of the superconducting material and the layers 34 36. After each internal reflection a proportion 40 of the reflected electromagnetic radiation is transmitted out of the device through the reflective layer 36. For certain wavelengths, constructive interference of electromagnetic radiation transmitted out of the device after each internal reflection, is obtained. The wavelengths at which constructive interference occurs are dependent on the thickness and refractive index of the material of which the device is formed, as well as on the carrier concentration, temperature and magnetic field. In a variant of the embodiment of FIG. 4, the reflective or mirrored layers 34 36 are not provided. Instead, reflection of electromagnetic radiation is obtained, in operation, due to the mismatch in refractive index between the transparent superconductor material and its surroundings, for example a vacuum.

Etalons and fabry-perot interferometer devices made from transparent superconductor material benefit from the high refractive index, high reflectivity and anomalous dispersion near $\lambda_{crit}$. Since the response of such devices is dependent on differences in optical path length the diverging refractive index near $\lambda_{crit}$ results in a diverging full-width half maximum (fwhm) resolution near $\lambda_{crit}$.

Figure 5A:
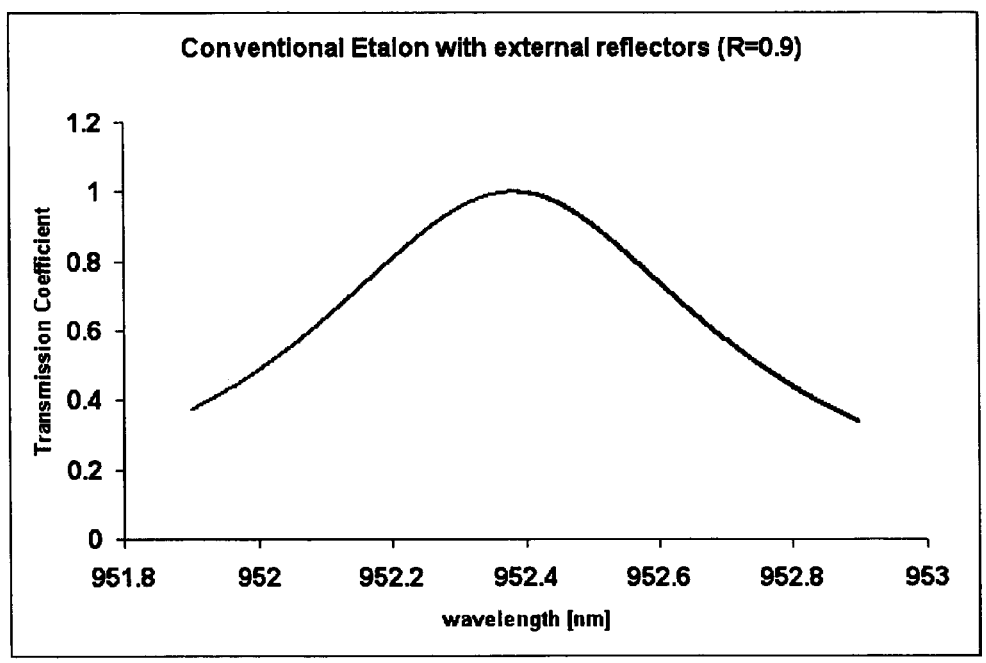
FIGS. 5a, 5b and 5c are graphs of etalon response for a conventional etalon, and etalon response for a transparent superconductor etalon without and with external reflectors respectively.
Figure 5B:
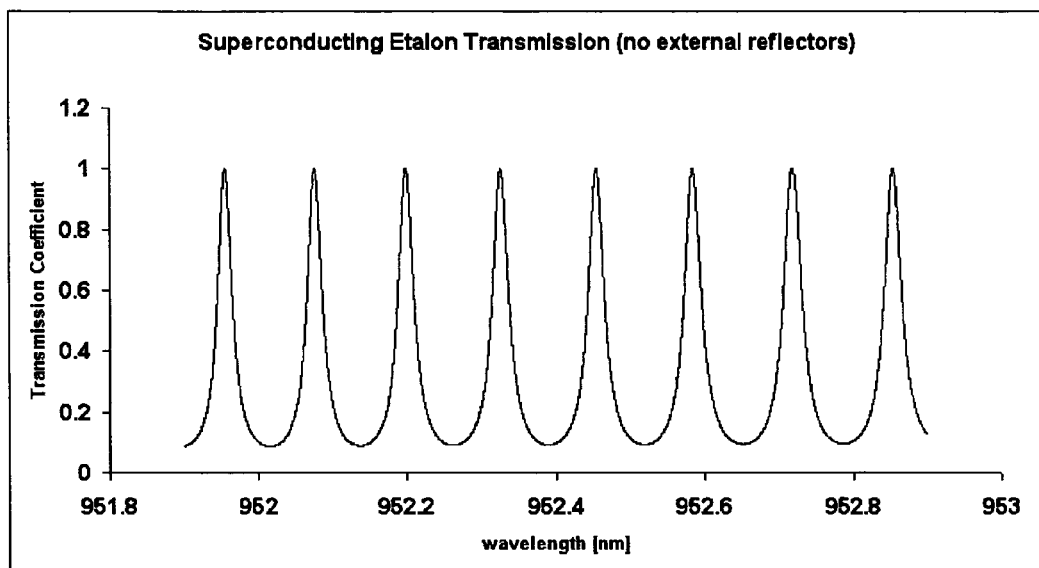
Figure 5C:
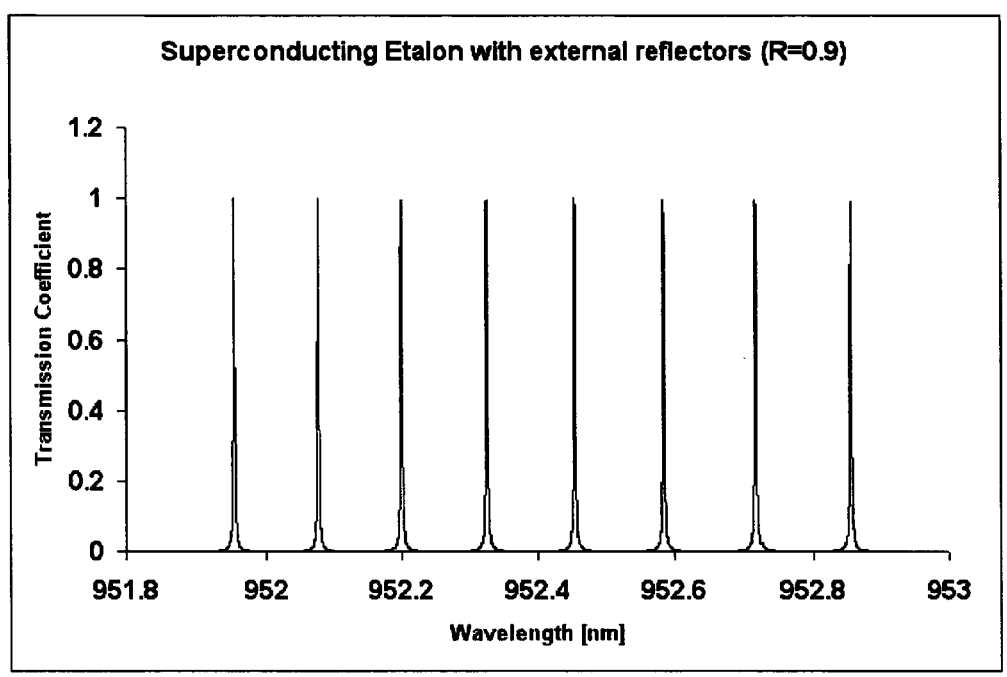

The response of a conventional etalon made from prism glass and with external reflectors having a reflection coefficient R=0.9, and having a thickness of 10 μm and dispersion D=85,400 m$^{-1}$ is shown in FIG. 5a. The response of an etalon made from ITO, with no external reflectors and with carrier concentration 2.5×10$^{21}$ cm$^{-3}$ and thickness of 10 μm is shown in FIG. 5b. The response of an etalon identical to that of FIG. 5b but including reflectors having a reflection coefficient R=0.9 is shown in FIG. 5c. It can be seen that, for a similar range of wavelengths the ITO devices provide a far greater number of, and far sharper, response peaks than the conventional device. Transparent superconductor etalon or interferometer devices may be used, for instance, in laser line narrowing, in which a laser beam is applied as an input to the etalon or interferometer device.

The etalon or fabry-perot interferometer device of FIG. 4 may be operated at a fixed operating temperature and magnetic field to ensure that the output of the device does not vary during operation due to variation of temperature-dependent (or magnetic field- or pressure-dependent) refractive index characteristics. Alternatively, the temperature and/or magnetic field may be variable during operation to provide a tunable etalon or interferometer.

In contrast, other embodiments rely on the variation of physical parameters, such as temperature, magnetic field or pressure, during operation in order to provide a desired variation in the refractive index of transparent superconductor material.

It should be noted that each of the embodiments described herein may also be operated as sensors for detecting variation of at least one physical parameter to which the transparent superconductor material is subject. For instance, in the case of the apparatus of FIG. 1, variation of the position of electromagnetic radiation of a predetermined wavelength or range of wavelengths on the detector array 8 may be monitored. A variation in the position of the electromagnetic radiation on the detector array may be indicative of a variation in refractive index caused by a variation in temperature (or pressure or magnetic field). Other characteristics of the electromagnetic radiation, such as intensity and wavelength, received after interaction with the transparent superconductor material may also be monitored for variations indicative of a variation in a physical parameter. If the apparatus is suitably calibrated, the variation in temperature (or pressure or magnetic field) may be quantified.

Figure 6A:
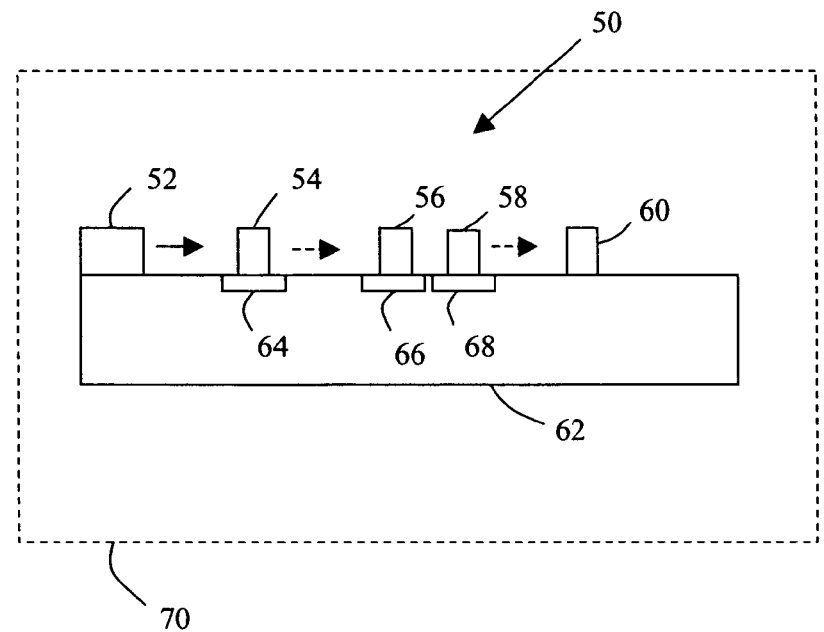
FIGS. 6a and 6b are schematic diagrams of an optical routing arrangement.
Figure 6B:
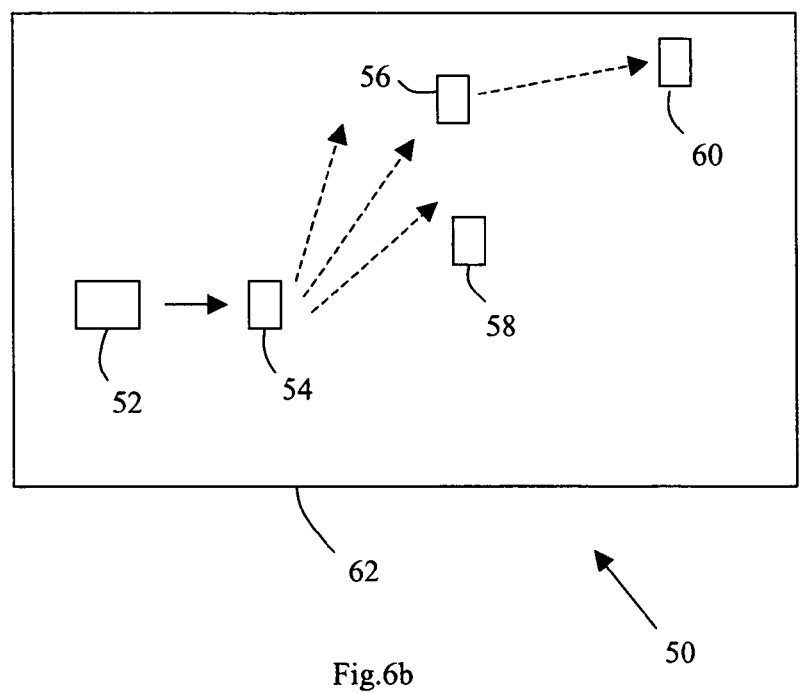

An example of an embodiment which relies on the variation of physical parameters, namely a routing apparatus 50, is shown in FIGS. 6a and 6b. The embodiment is shown in cross section in FIG. 6a and from the top in FIG. 6b.

A source of electromagnetic radiation 52, routers 54 56 58 and a detector 60 are mounted on a support structure 62. Heater and thermometer circuitry 64 66 68 is also mounted on the support structure 62 in thermal contact with a router 54 56 58. The heater and thermometer circuitry is connected to control circuitry (not shown) and is used to control the temperature of each router and thus to control the refractive index characteristics of the router. The support structure is in thermal contact with, refrigeration apparatus 70. The support structure may also be located inside magnetic shielding (not shown), depending on the level of sensitivity and control required of the apparatus. The magnetic shielding may be, for instance, mu-metal and/or cryoperm shielding. Alternatively or additionally, magnetic shielding may also be provided around each router 54 56 58 individually.

Each of the routers 54 56 58 comprises transparent superconductor material, and each may be similar to the prism of FIG. 1.

In operation, the routing apparatus 50 is cooled to below the superconducting transition temperature of the transparent superconductor material. The temperature of each router 54 56 58 is controlled individually by the control circuitry using the heater and thermometer circuitry 64 66 68. Electromagnetic radiation is directed by the source 52 to one of the routers 54. The electromagnetic radiation is dispersed by the router 54 and electromagnetic radiation at each wavelength is transmitted in a respective, different direction by the router 54.

The routing apparatus is used for routing of electromagnetic radiation having a predetermined wavelength or range of wavelengths. The temperature of the router 54, and thus its refractive index characteristics, is controlled to be such as to direct the electromagnetic radiation having the predetermined wavelength or range of wavelengths to a selected one of the other routers 56 58. The temperature, and thus refractive index, of that selected router 56 is also controlled so as to direct the electromagnetic radiation having the predetermined wavelength or range of wavelengths from the selected router 56 to the detector 60. If it is desired to switch the route of the electromagnetic radiation, the temperature of the router 54 is altered so that the electromagnetic radiation having the predetermined wavelength or range of wavelengths is transmitted to the other of the routers 58, which in turn transmits the electromagnetic radiation having the predetermined wavelength or range of wavelengths to the detector 60.

Magnetic field sources and control circuitry may be used in place of, or as well as, the heater and thermometer circuitry 64 66 68. The magnetic field sources may be superconducting solenoid magnets. Alternatively, smaller on-chip magnetic field sources may be used. The routing of the electromagnetic radiation may be varied by varying the magnetic field applied to the routers 54 56 58. In general, faster response times are obtained by varying applied magnetic field than by varying temperature.

Similarly, a pressure source and control circuitry may be used in place of, or as well as, the heater and thermometer circuitry 64 66 68. The pressure source may comprise a pressure cell in which, for instance, the transparent superconductor material may be sandwiched between moveable pressure plates or positioned on a diamond anvil. High pressures are generally required in order to vary the properties of the transparent superconductor material significantly, and variations in pressure experienced by the transparent superconductor material in use in the superconducting state and in the absence of a pressure source are not generally sufficient to vary the properties of the transparent superconductor material significantly.

The embodiment of FIG. 6 is a simple example of a router apparatus, comprising three routers and two possible optical paths.

Other embodiments provide more extensive optical routing or switching apparatus, comprising more routers or switches and/or operating over long distances. A number of different frequency laser signals are routed along different paths by selecting the active frequencies of the transparent superconductor material, for instance ITO, by controlling, for instance, temperature or magnetic field. If used for optical communications it means that a client is able to control electronically a route to a target host via transparent superconductor switches by controlling the temperature of the switches. An uninterrupted optical route can thus be established, allowing direct optical connection between client and host, without having to convert the signal into electronic form on the route between the client and host, potentially providing increased communications speeds.

It is important to note that the routers of the described embodiment can provide quantum non-demolition routing. Thus, in contrast to conventional optical routers that convert photons into electrons and back into photons, the routers ensure that the quantum mechanical wave functions of the photons that make up the routed electromagnetic radiation remain unaltered throughout the routing procedure. Quantum non-demolition routing is important for quantum key distribution and quantum cryptology. In such applications, the routed electromagnetic radiation is usually at very low intensity, down to single photon levels.

The routers, as shown for example in FIG. 6, may also be operated as switches. In particular, variations in temperature or magnetic field may be used to vary the refractive index to select whether electromagnetic radiation of a predetermined wavelength or range of wavelengths is transmitted or reflected.

In further embodiments, applied magnetic fields, for example the magnetic field components of applied electromagnetic radiation, are used to change the refractive index of the transparent superconducting material, and to provide magneto-optic effects, respectively.

By controlling the superconducting state of the transparent superconductor material, for example the number of superconducting charge carriers, and by controlling the properties of applied electromagnetic radiation, for example the intensity, wavelength and/or bandwidth, any desired non-linear optical effects can be provided. A variety of known optical apparatus provide non-linear effects or include non-linear elements. A transparent superconducting element with associated temperature, magnetic field and/or pressure control devices may be substituted in any such known optical apparatus, as appropriate, to function as a non-linear optical element.

Figure 7A:
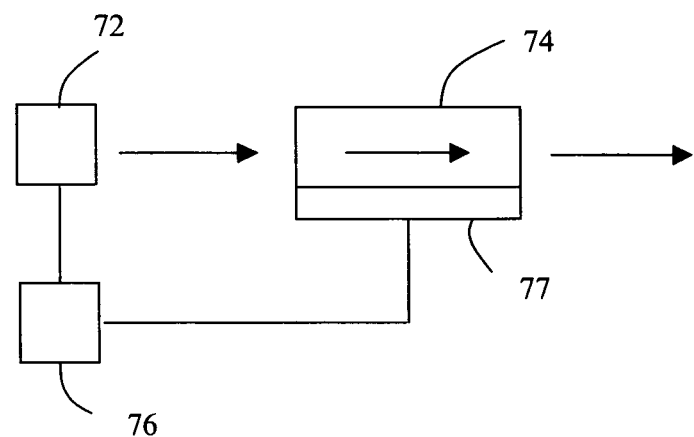
FIGS. 7a and 7b are schematic diagrams showing alternative embodiments in overview.

A further embodiment is illustrated in FIG. 7a. A source of electromagnetic radiation 72 and a transparent superconducting element 74 are arranged on an optical axis. The source of electromagnetic radiation 72 is connected to a controller 76 which is operable to control properties of electromagnetic radiation (for example, intensity, wavelength and bandwidth) of electromagnetic radiation transmitted along the optical axis. The source 72 can be a laser source or a wide bandwidth source. A temperature control system 77 is associated with the transparent superconducting element and is operable to control the temperature of the transparent superconductor element 74 in the superconducting state, thereby to control the number of superconducting charge carriers and thus optical properties of the transparent superconductor element 74. In variants of the embodiment magnetic field and/or pressure control systems are provided in addition to the temperature control system 77. The temperature control system 77 (and the magnetic field and/or pressure control systems) is not shown in detail in FIG. 7a, but it includes the same or similar components as the temperature (and magnetic field and/or pressure) control arrangements of FIG. 1 or 6.

The controller 76 controls both the properties of applied electromagnetic radiation and the number of superconducting charge carriers (via control of temperature and/or pressure or magnetic field) thereby to control transmissive, reflective, refractive or dispersive effects provided by the transparent superconductor element 74 to the applied electromagnetic radiation. In particular variants, and modes of operation, the effect provided by the transparent superconductor element is a non-linear effect and the apparatus provides at least one of ultrashort light pulse generation, Kerr mode locking, self focussing or super-continuum generation. Additional known components can be provided in the apparatus in order to provide desired non-linear effects, in accordance with known techniques.

Figure 7B:
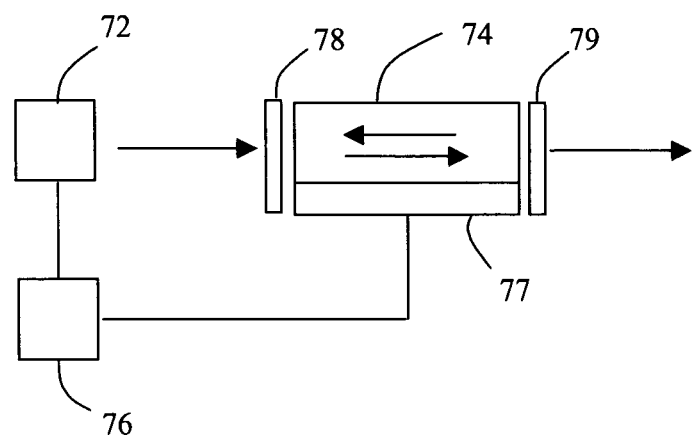

A variant of the embodiment of FIG. 7a is illustrated in FIG. 7b, in which the transparent superconductor element 74 is provided between reflective or partially reflective elements 78, 79 that form a resonant cavity.

In a further embodiment, switches or routers may be used as optical logic devices, which may be operated near to the superconducting critical magnetic field $H_c$, where it is possible to find regimes where the magnetic field in a low-power light beam is strong enough to alter significantly the optical properties of the device.

In further embodiments, optical elements with non-linear refractive index are used to construct quantum logic gates in which the non-linearity of the optical elements is of sufficient magnitude for a single photon A present in the optical element to significantly alter the propagation of a second photon B through the element. The photon A is referred to as a control photon and photon B is referred to as a signal photon.

Figure 8A:
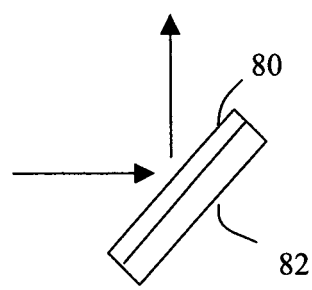
FIGS. 8a and 8b are schematic diagrams of a logic gate.
Figure 8B:
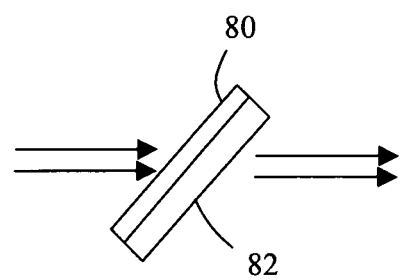

In one example, illustrated in FIGS. 8a and 8b, an optical logic device comprises transparent superconductor material 80 deposited on a substrate 82. The temperature of the optical component and/or the magnetic field applied to the device is controlled similarly to the way described for the embodiments of FIGS. 1 to 5.

The device is operated in the superconducting state, relatively close to the superconducting transition and at such a point in the superconducting phase diagram that even relatively small changes in magnetic field cause relatively large changes in refractive index. Under such operating conditions it has been found that the magnetic field component of electromagnetic radiation applied to the device can, itself, have a significant effect on the refractive index of the device.

As shown in FIG. 8a, the refractive index of the device is such that if electromagnetic radiation below a predetermined power level and at a predetermined wavelength or range of wavelengths is applied to the device, the refractive index of the device is such that the electromagnetic radiation is reflected. If electromagnetic radiation above the predetermined power level, at the predetermined wavelength or range of wavelengths, is applied to the device the magnetic field component of the electromagnetic radiation alters the superconducting carrier concentration and thus the refractive index of the device, such that the electromagnetic radiation is transmitted through the device.

In the preferred mode of operation, the device is operated as an AND gate. The device is arranged to receive electromagnetic radiation from two (or more) optical inputs. The power levels of electromagnetic radiation from the optical inputs are set such that the electromagnetic radiation from one or other input alone is below the predetermined level needed to switch the device between reflective and transmissive modes, but such that the power level of electromagnetic radiation from both inputs received simultaneously is above the predetermined level.

Thus, in operation, if a beam of electromagnetic radiation is applied to the device from only one or other of the inputs the beam is reflected. If electromagnetic radiation is applied simultaneously to the device from both inputs, the two beams of electromagnetic radiation are transmitted through the device.

The device of FIGS. 8a and 8b is one example of a transparent superconductor logic device, operating as an AND gate. Many other transparent superconductor logic devices, which may have different functionalities, can be envisaged. Combinations of such logic devices are also envisaged, to provide optical processors or computers. Since each transparent superconductor logic device may be configured to be transparent to light below the critical wavelength, and since the refractive index and thus the reflection/transmission properties are strongly wavelength dependent, an optical processor based on such devices could operate at a number of different wavelengths at the same time.

Figure 9:
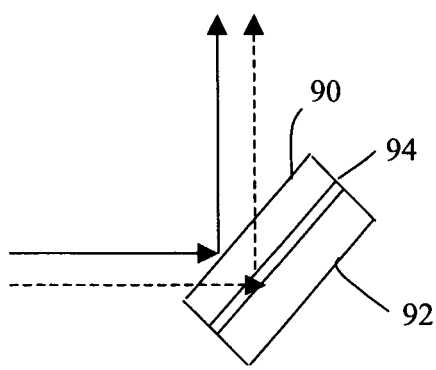
FIG. 9 is a schematic diagram of a multi-wavelength logic gate.

An example of a multi-wavelength device is shown in FIG. 9. The device comprises two layers of transparent superconductor material 90 92 separated by a passivation layer 94 that is transparent to electromagnetic radiation in the wavelength ranges of interest. In this example, the passivation layer is formed of Si. The two layers of transparent superconductor material 90 92 are ITO, but are subject to different preparation conditions and, in operation, have different superconducting electron densities, and thus different critical wavelengths, at any given temperature.

In the example shown a first signal, indicated by a solid arrow, applied at a first time has a wavelength close to the critical wavelength of first layer of transparent superconductor material 90. Thus, it interacts with the first layer 90 and, in this case, is reflected by the first layer 90.

A second signal, indicated by a dashed arrow, applied at a second time has a wavelength that is far from the critical wavelength of the first layer 90 and so passes through the first layer 90 unhindered. The wavelength of the second signal is close to the critical wavelength of the second layer 92, and so it interacts strongly with the second layer 92 after passing through the first layer 90 and is reflected from the second layer 92.

In a mode of operation in which the magnetic field components of the first and second signals are intended to cause a switching effect, the etalon response of the device may be exploited. In this case the second signal is chosen to have a magnitude such that it shifts the interference pattern of the first layer 90 on to the next maximum, and thus so that is has virtually no influence on the switching properties of the first layer 90.

It is also envisaged that all-optical logic chips may be constructed. In such chips, sufficiently thin ITO films and associated absorbers may be switched between reflective and transparent states by single photons, leading to all-optical information processors. In combination with quantum non-demolition routing that can provide massively parallel quantum computing.

Other embodiments comprise lenses formed of transparent superconductor material. Such lenses have different characteristics to conventional lenses, as different wavelengths are focussed at different distances due to the variation of refractive index with wavelength. Such lenses can be used in monochromators or in spectroscopic applications (operating in a similar manner to a prism, by spatially separating different spectral components).

In another embodiment, an optical bench is provided that comprises different optical elements, each comprising transparent superconductor material. Such a bench is configurable by a user controlling the temperature of, or the magnetic field or pressure applied to, the various optical elements. Such an optical bench is similar to the routing apparatus shown in FIG. 4 but would usually include a greater number and variety of different types of optical elements. Each optical element is usually moveable and/or replaceable. The optical bench could be configured for a particular purpose by controlling the temperature, pressure or magnetic field applied to the various optical elements and/or by suitable positioning of the optical elements.

In another embodiment, a series of transparent superconductor etalon or interferometer devices are positioned in front of a light source, usually a white light source, and the refractive index characteristics of each etalon or interferometer device is controlled to pass a desired electromagnetic spectrum. Thus, the embodiment would operate as an electromagnetic spectrum synthesizer.

In another embodiment, electromagnetic radiation is passed through transparent superconductor material in the superconducting state in order to slow the electromagnetic radiation. The embodiment may be used as a delay line. The electromagnetic radiation is, in general, normally incident on the transparent superconductor material in that embodiment. A beam-splitter is optionally provided before the delay line, and a portion of radiation from the beam-splitter is passed through the delay line and a portion is transmitted undelayed. The delayed and undelayed electromagnetic radiation may subsequently be recombined.

Figure 10:
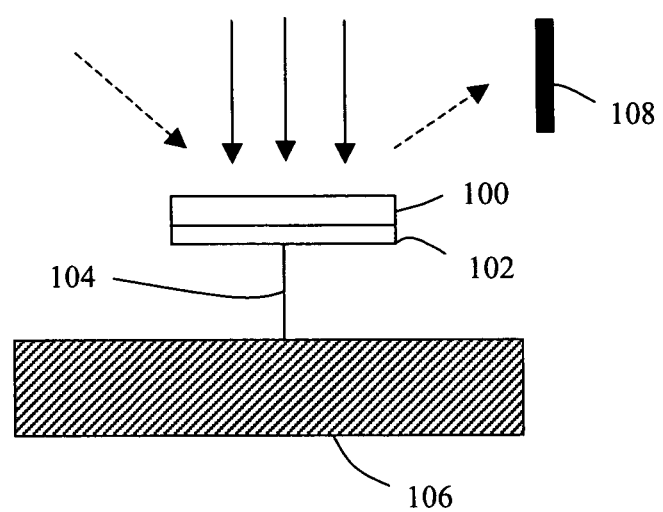
FIG. 10 is a schematic diagram of a sensor.

An embodiment in which an optical apparatus comprising transparent superconductor material is operated as a bolometer is shown in FIG. 10. The bolometer comprises a layer of transparent superconductor material 100 on a substrate 102, linked by a weak thermal link 104 to a heat sink 106. A detector array 108 is provided adjacent to the bolometer. A source of monitoring electromagnetic radiation (not shown) is also provided, and is arranged relative to the bolometer 100 102 and detector array 108 such that in operation monitoring radiation (indicated by dashed arrows) is received by the detector array 108 after interaction with the transparent superconductor material 100.

In operation, the bolometer 100 102 is cooled to the superconducting state, close to the critical wavelength, and is exposed to radiation to be measured (indicated by solid arrows). The radiation to be measured is received by the bolometer and absorbed by the substrate layer causing a rise in temperature. The rise in temperature is measured by measuring variation in the monitoring radiation using the detector array 108.

The embodiments described above are configured to operate within the visible and near-infrared regions of the electromagnetic spectrum. Embodiments may also be operated, for instance, in operating regions falling within at least part of the range from the ultraviolet or far-ultraviolet to the far-infrared.

In general there is no maximum wavelength operating limit, presuming that a suitable material, transparent in the wavelength region of interest, is used. The minimum operating wavelength is dependent on the carrier concentrations of available materials.

The range of temperatures at which the various embodiments are operated is limited by the range of wavelengths to be used or investigated and the superconducting transition temperature of the transparent superconductor material that is used. If ITO, having a $T_c$ of up to around 3.5K, is used then optical routing and optical processing or computing embodiments may be operated at temperatures below but near to the transition temperature of 3.5K, and embodiments requiring higher stability, such as prisms or spectrometers, may be operated at lower temperatures, around 2K.

Some theoretical aspects are now discussed.

The standard methods of modelling the electrodynamics and response to electromagnetic radiation of superconductors are based upon the application of Maxwell's equations, while considering the infinite conductivity of the superconductor and the interaction of photons with pairs of superconducting electrons (Cooper pairs).

However, in order to get an accurate picture of the behaviour of photons in a superconductor it has been found that some fundamental modifications to the model describing electromagnetism are required. The vector and scalar potentials which can be shown to give rise to the observable electric and magnetic vector fields are no longer arbitrary. Also, since the system is no longer in an ensemble of states but in a well-defined quantum state with a macroscopic wave function, the wave function becomes observable and its phase is no longer arbitrary. Thus, U(1) phase rotational symmetry is broken in a superconducting material, giving rise to massive electromagnetism and requiring application of the Proca relations instead of Maxwell's equations.

The electric and magnetic field can be defined in terms of a scalar potential $\phi$ and vector potential $\vec{A}$:

$$\vec{B} = \nabla \times \vec{A} \tag{4a}$$

$$\vec{E} = -\left(\frac{1}{c}\right)\frac{\partial \vec{A}}{\partial t} - \nabla \phi \tag{4b}$$

In normal macroscopic systems the fields $\vec{E}$ and $\vec{B}$ are unchanged under the following transformations:

$$\vec{A} = \vec{A}' + \nabla \chi(\vec{r}, t) \tag{5a}$$

$$\phi = \phi' + \frac{\partial \chi(\vec{r}, t)}{\partial t} \tag{5b}$$

where $\chi$ is an arbitrary well-behaved function of $\vec{r}$ and t.

These transformations leave the solutions of the Schrödinger equation unaltered except for a local phase shift:

$$\psi' = \psi \exp\left(-i\frac{e\chi(\vec{r}, t)}{\hbar}\right) \tag{6}$$

This rotation of the phase of the complex wave function $\psi$ leaves the Hamiltonian of the system unaltered. However, in a superconducting material the local phase of the order parameter is observable. Ginzburg-Landau theory introduces an energy cost for gradients in the phase. Thus, in a superconductor, electromagnetic U(1) phase symmetry is broken and the transformations of equations (5a) and (5b) are no longer gauge transformations.

Such symmetry breaking causes photons to acquire a non-zero rest mass via the Higgs mechanism.

The mass of a photon can be calculated as $$m_\gamma = \frac{\mu_\gamma \hbar}{c} \quad (7)$$

where $\mu_\gamma^{-1}$ is the inverse reduced Compton wavelength of the photon

Inside a superconductor, $\mu_\gamma^{-1}$ is equal to the London penetration length $\lambda_L$, allowing the mass of a photon inside a superconductor to be calculated as:

$$m_\gamma = \frac{\hbar}{\lambda_L c} \quad (8)$$

The group velocity $v_g$ and phase velocity $v_p$ of massive photons is found to be:

$$v_g = c\left(1 - \frac{\mu_\gamma^2 c^2}{\omega^2}\right)^{1/2} \quad (9)$$

$$v_p = c\left(1 - \frac{\mu_\gamma^2 c^2}{\omega^2}\right)^{1/2}$$

Substituting $\lambda_L$ for $\mu_\gamma^{-1}$ and expressing the phase and group velocities a function of vacuum wavelength $\lambda$ instead of angular frequency $\omega$ we obtain:

$$v_p = c\left(1 - \frac{\lambda^2}{4\pi^2 \lambda_L^2}\right)^{-1/2} \quad (10)$$

$$v_g = c\left(1 - \frac{\lambda^2}{4\pi^2 \lambda_L^2}\right)^{1/2}$$

As $\lambda$ approaches zero the group velocity approaches the vacuum value. The group and phase velocities become complex above a critical wavelength $\lambda_{crit}$, given by:

$$\lambda_{crit} = 2\pi\lambda_L \quad (11)$$

Above $\lambda_{crit}$ photons do not propagate freely but decay exponentially with distance.

Figure 11A:
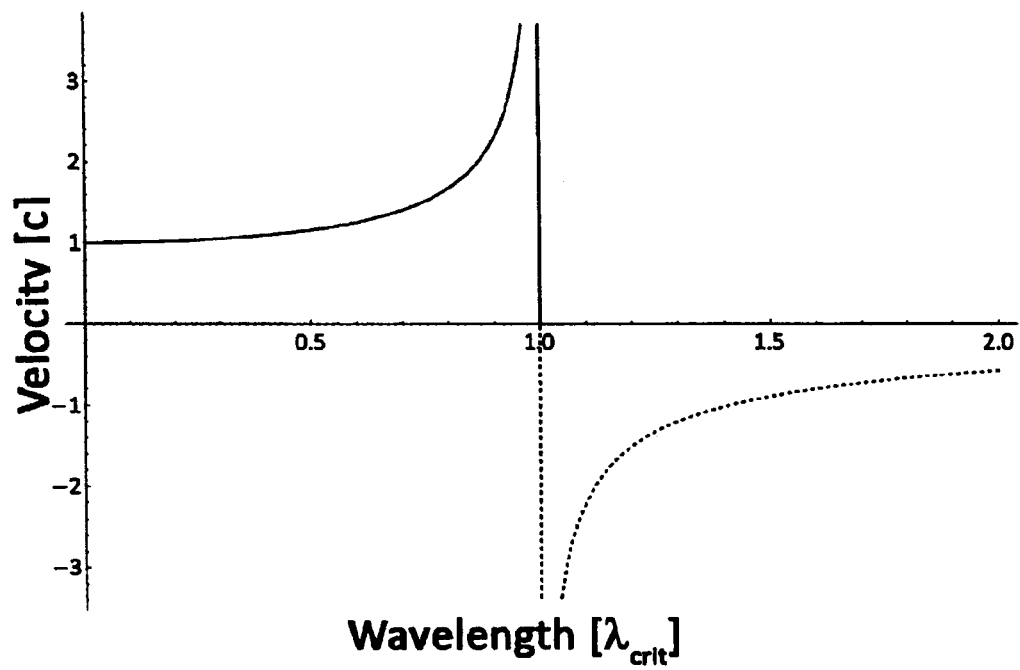
FIGS. 11a and 11b are graphs showing the variation of real and imaginary components of phase and group velocity as a function of wavelength for a transparent superconducting element.
Figure 11B:
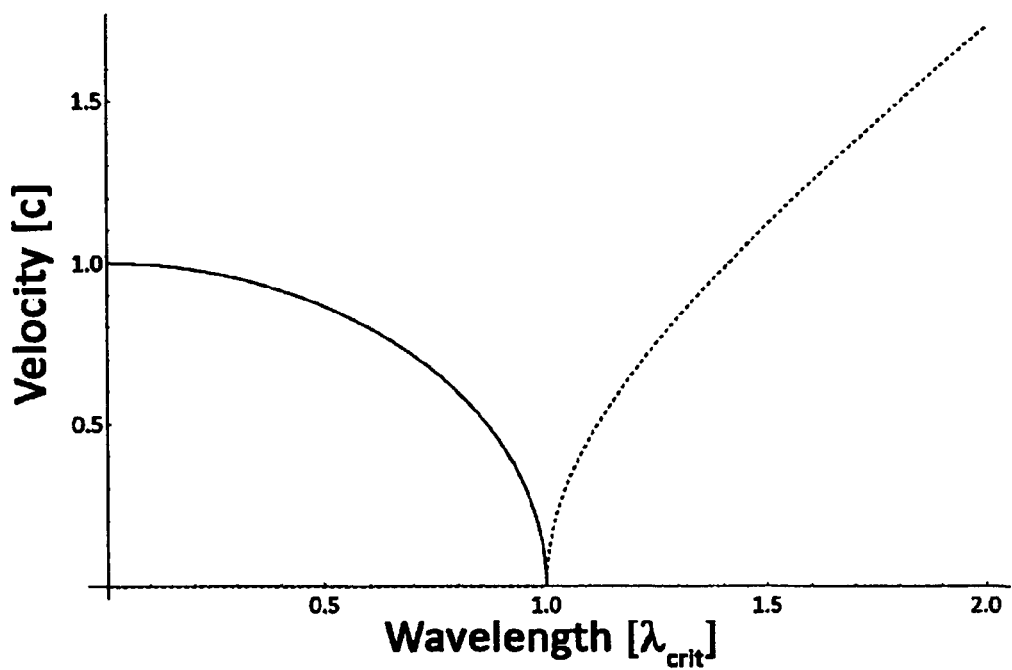

The variation of phase and group velocity with wavelength are illustrated in the graphs of FIGS. 11a and 11b. The phase velocity and group velocity are plotted as a function of photon vacuum wavelength, where the vacuum wavelength of the incident light is given in units of critical wavelength. The graphs show the real (black) and imaginary (red) components of the respective complex velocities. The phase and group velocities are either purely real or purely imaginary over the entire real wavelength axis.

It can be shown that the above treatment is equivalent to considering the propagation of an electromagnetic wave through a free-electron gas of plasma frequency $\omega_p = c/\lambda_L$, using the massless Maxwell equations. Using the assumption that scattering occurs between electrons since they are in the superconducting state, this approach will lead to the dispersion relations of equation (10). Dynamically, this is identical to assuming a non-zero photon rest mass. Historically, the propagation behaviour of light through refractive media has provided the inspiration for the Higgs mechanism.

Two kinds of refractive index can be considered to exist, the phase refractive index $n_p$ and the group refractive index $n_g$, where $n_g = 1/n_p$. For refraction optics, used for lenses, prisms and similar optical elements, the phase refractive index $n_p$ is used. The refractive indices are given by:

$$n_p(\lambda) = \frac{c}{v_p(\lambda)} \quad (12)$$

$$n_g(\lambda) = \frac{c}{v_g(\lambda)}$$

The group refractive index $n_g$ of a superconductor as a function of vacuum wavelength $\lambda$ will diverge as $\lambda \to \lambda_{crit}$. FIG. 2a shows the group refractive index of ITO as a function of photon vacuum frequency.

Figure 12:
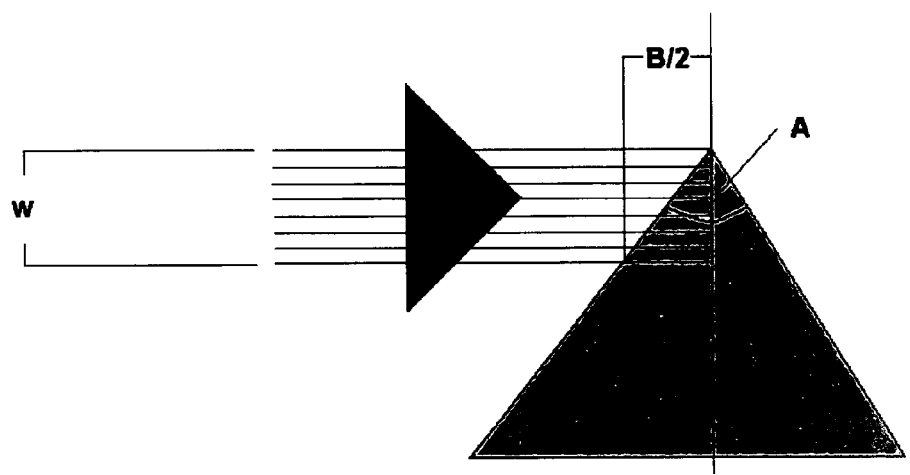
FIG. 12 is a schematic diagram of a conventional prism.

Turning to consideration of the resolving power, the simplest expression for the resolving power R of a prism, the Raleigh limit, is given by:

$$R = B\frac{dn_p}{d\lambda} \quad (13)$$

where B is the base width of the prism. This expression is valid for the case where the beam is limited in one direction by the apex of the prism and the angle of incidence is that of minimum deviation $\delta$. Thus, if the prism has an axis of symmetry normal to its base, beam width and effective width of prism base are related to each other trigonometrically through the apex angle of the prism:

$$B\frac{dn}{d\lambda} = 2w\tan\left(\frac{A}{2}\right)\frac{dn}{d\lambda} \quad (14)$$

where w is the transverse beam width and A is the apex angle, illustrated schematically in FIG. 12.

Taking the derivative of n w.r.t. $\lambda$ we find the dispersion $D = dn_p/d\lambda$ to be given by:—

$$\frac{dn_p}{d\lambda} = \frac{d}{d\lambda}\left(1 - \frac{\lambda^2}{4\pi^2 \lambda_L^2}\right)^{-1/2} \quad (15a)$$

$$\frac{dn_p}{d\lambda} = -\frac{\lambda}{4\pi^2 \lambda_L^2}\left(1 - \frac{\lambda^2}{4\pi^2 \lambda_L^2}\right)^{-3/2} \quad (15b)$$

The slopes of equations (15a) and (15b) diverge near $\lambda_{crit}$.

As can be seen from equation (14) the intrinsic limit of resolving power for a prism spectrometer depends on the maximum volume of the prism and the maximum beam width available. The dispersion $D = dn/d\lambda 0$ is simply a scaling factor.

Thus, even for prisms with B=100 µm (beam width 0.4 mm, and apex angle 7°) resolving powers of order $10^7$ result. It is necessary to use relatively small apex angles, since otherwise the minimum deviation $\delta$ is greater than 90° at the wavelength of interest and total internal reflection results.

Figure 13:
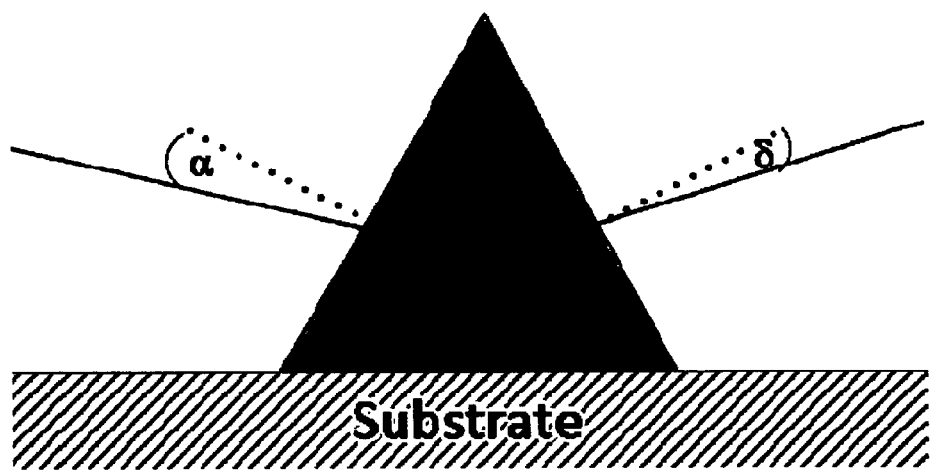
FIG. 13 is a schematic diagram of a transparent superconducting prism.

A further embodiment of a transparent superconducting prism is shown in FIG. 13. It can be seen that the ray diagram looks slightly different to that of a normal prism, as the incident and transmitted rays are both bent away from the prism base. The prism has an apex angle of 60° and a critical wavelength of 750 nm. An incident wavelength of 700 nm yields a phase refractive index of $n_p$=0.36. At an angle of incidence of α=10.34° the light travels parallel to the prism base i.e. the prism is at minimum deviation.

It can be shown from Fresnel's equations that for the prism of FIG. 13 (α=10.34°, β=γ=30°) the transmission coefficient of the prism is better than 72% for transverse electric polarizations and better than 82% for transverse magnetic polarizations, assuming the prism is in vacuum.

Figure 14:
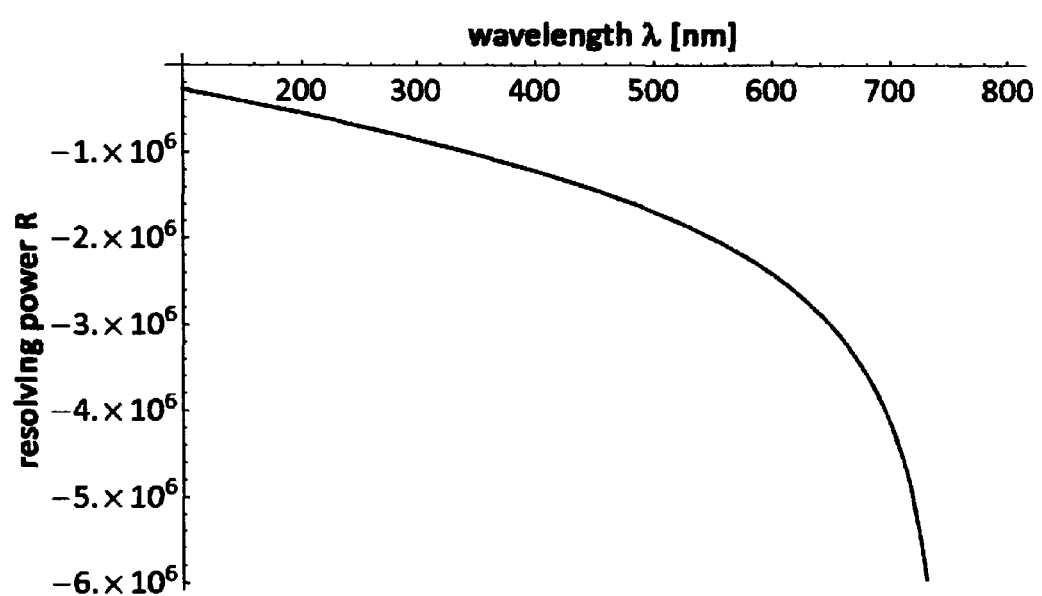
FIG. 14 is a graph of resolving power with wavelength for a transparent superconducting prism.

From equation (13) it can be seen that the resolution ratio of two prisms of identical geometry and with respective resolving powers $R_1$ and $R_2$ only depends on the ratio of their respective phase dispersions. The phase dispersion of a conventional prism based on F2 Schott glass is approximately $-8.54 \times 10^4$ $m^{-1}$, whereas the transparent superconducting prism of FIG. 13 with a critical wavelength of 750 nm has a dispersion of $3.5 \times 10^6$ $m^{-1}$. Consequently the resolving power of the transparent superconducting prism at a minimum deviation is almost two orders of magnitude greater than that of a conventional prism of comparable geometry. The variation of resolving power with wavelength for the transparent superconducting prism is plotted in FIG. 14.

Figure 15:
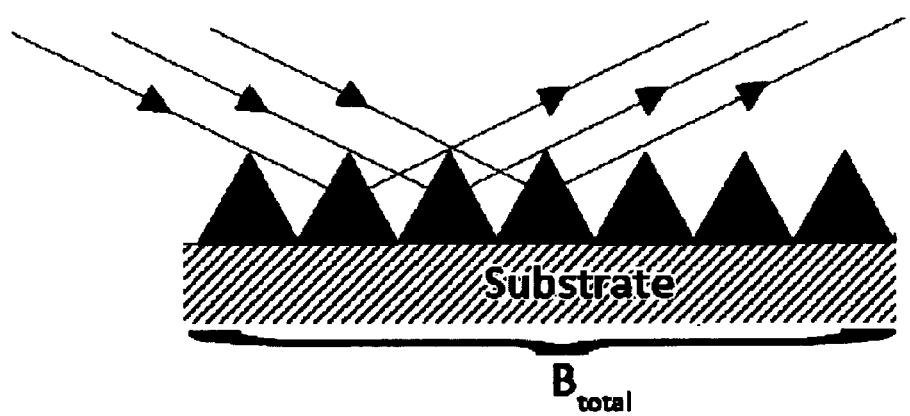
FIG. 15 is a schematic diagram of a further superconducting prism.

For transparent superconducting prisms to be used in place of conventional prisms it is desirable for them to have base widths B comparable to those of conventional prisms. As ITO is not transparent in its bulk state, ITO prisms would usually be made by depositing or machining ITO films into microscopic prisms. In a further embodiment, illustrated in FIG. 15, a series of microscopic prisms are formed on a substrate to form what may be termed a Fresnel prism, analogous to a Fresnel lens. As both incident and transmitted rays are bent away from the prism base for transparent superconducting prisms, the series of microscopic prisms behave as a single prism having a base width equal to the sum of the base widths of the series of microscopic prisms.

Transparent conductors and transparent superconductors are now considered in more detail.

It has previously been generally assumed that any superconductor is opaque to any photons with energy Eγ>2Δ, where the superconducting energy gap Δ is of order 100 μeV.

A cloud of free charge carriers with a plasma frequency $\omega_p$ excited by radiation of frequency ω behaves as a harmonic oscillator, yielding a phase refractive index $\eta_p$ given by:—

$$\eta_p^2(\omega) = 1 + \frac{\omega_p}{-\omega + i\gamma\omega} \quad (16)$$

Dissipation by the gas is governed by the imaginary component, which is proportional to the inverse scattering time 1/γ.

For normal material as ω approaches $\omega_p$ the imaginary part of equation (16) becomes dominant and the material is opaque. Consequently, the extreme optical behaviour described herein cannot be observed for normal state materials. Since superconducting electrons do not scatter, the superconducting scattering time $\gamma_s \to \infty$, and no dissipation occurs for $\omega \to \omega_p$, allowing access to extreme optical behaviour of the superconductor near $\lambda_{crit}$, provided that transparency can be ensured by the band structure, as outlined.

ITO is a particularly suitable material for use as a transparent superconducting optical element. The critical wavelength $\lambda_{crit}$ for an ITO film with $n_s \approx 2 \times 10^{27}$ $m^{-3}$ can be calculated to be ≈550 nm, which is well within the transparent bandpass for the ITO film at that carrier concentration.

It can be shown by experiment that the transmission/absorption behaviour of a material in the superconducting state approaches the transmission/absorption behaviour of the same material in the normal state as the photon energy becomes large compared to 2Δ. The reason for this is the breaking of superconducting electron pairs ("Cooper pairs") by the photon. Consequently, any electron which is directly excited by a photon with energy $E_{ph}$>>2Δ behaves and scatters as a normal state electron. Conventional superconductors like Pb or Nb are opaque in the normal and superconducting state. However, since ITO has got a high optical transmission/low absorption in the normal state it is still transparent in the superconducting state. One consideration in operating ITO as a transparent superconducting element is to keep the photon flux sufficiently low that the reduction in the cooper pair density in the ITO film remains small.

For a transparent superconductor to be useful it is necessary to show that the critical wavelength $\lambda_{crit}$ is within the wave band over which the transparency applies. The critical wavelength can be calculated from the London penetration depth as:

$$\lambda_{crit} = 2\pi\lambda_L \quad (17)$$

The London penetration depth can be calculated as:

$$\lambda_L^2 = \frac{m_s}{e^2 \mu_0 n_s} \quad (18)$$

where $m_s$ is the mass of a single superconducting electron, $n_s$ is the superconducting electron density and e is the electronic charge.

Substituting from (18) into (17) we obtain $$\lambda_{crit} = \frac{1}{n_s^{1/2}} \frac{2\pi m_s^{1/2}}{e\mu_0^{1/2}} \quad (19)$$

$$\lambda_{crit} \propto n_s^{-1/2} \text{ (already recited above)} \quad (2)$$

As can be seen, all of the parameters in equation (19) are fundamental constants except for the superconducting electron density $n_s$, giving rise to the dependency expressed in equation (2).

If we assume that the density of superconducting electrons in the sample cannot exceed the charge carrier concentration of the normal state, then normal state carrier concentration becomes the controlling variable setting the minimum accessible wavelength. By reducing the fraction of carriers in the superconducting state (by way of, for example, temperature or magnetic field control) larger wavelengths become available.

A degree of control over $\lambda_{crit}$ is possible, as can be understood from the approximation given by equation (3) (already recited above) in zero applied magnetic field and from equation (20) in applied magnetic field H:

$$n_s^0(T) = n_2^0(0)\left[\frac{T_c^0 - T}{T_c^0}\right] \quad (3)$$

$$n_s^0(T) = n_s^0(0)\left[\frac{T_c^0 - T}{T_c^0(1 - H/H_c^0)^{1/2}}\right] \quad (20)$$

where $n_s^0$ is the density of superconducting electrons; $T_c^0$ is the Ginzburg-Landau transition temperature, H is the applied magnetic field, and $H_c^0$ is the superconducting critical field at zero temperature.

Thus, by varying the temperature the value of $\lambda_{crit}$ can be increased arbitrarily. The true limit is in its minimum value, defined by the magnitude of $n_s^0$ (0). For ITO the carrier concentration can be varied by changing the exact composition and deposition technique. However, it appears that the transparent bandwidth reduces with increasing carrier concentration.

The London penetration depth of Aluminium is known to be ~16 nm and the carrier concentration of Al can be found to be approximately as follows (assuming Al to be monovalent):

$$n_{Al} = \frac{\rho_{Al}}{u_{Al}} N_A \quad (21)$$

where $\rho_{Al}$ is the density of Aluminium, $u_{Al}$ the atomic weight and $N_A$ Avogadro's number.

Using (21) we find the carrier concentration in Al to be of order $n_{Al}$=(0.1 $N_A$) cm$^{-3}$. Carrier concentrations of up to $2\times10^{21}$ cm$^{-3}$ have been achieved in the case of ITO. Using equation (2) we can now find an approximation for the value of $\lambda_{crit}$ to be expected from superconducting ITO.

$$\frac{\lambda_{crit}^{ITO}}{\lambda_{crit}^{Al}} = \frac{n_{ITO}^{-1/2}}{n_{Al}^{-1/2}} \quad (22a)$$

$$\lambda_{crit}^{ITO} = \lambda_{crit}^{Al}\left(\frac{n_{Al}}{n_{ITO}}\right)^{1/2} \quad (22b)$$

This yields $\lambda_{crit}^{ITO} \approx 551$ nm which is well inside the transparent region for an ITO film with carrier concentration $n<3\times10^{21}$ cm$^{-3}$. The coefficient of transmission as a function of wavelength for a 2 μm ITO film for different carrier concentrations is plotted in Granqvist et al, Thin Solid Films 411, 1-5 (2002).

Inside superconductors, photons have non-zero rest mass and massive electromagnetism applies. It has been demonstrated herein that based on massive electromagnetism the refractive index of superconducting materials approaches infinity as the wavelength of the incident electromagnetic radiation is increased towards the maximum wavelength $\lambda_{crit}$ at which electromagnetic-wave propagation is possible. The magnitude of $\lambda_{crit}$ is governed by the density of superconducting charge carriers.

The physical size required for any prism to obtain a given resolving power differs only by the scaling factor D. The dispersion D of a superconducting prism made of ITO with carrier concentration $3\times10^{21}$ cm$^{-3}$ is of order $10^8$ m$^{-1}$ in a narrow waveband below the critical wavelength of 551 nm. A typical value for the dispersion of a conventional prism is D=$8.54\times10^4$ m$^{-1}$ at 590 nm, implying that a superconducting prism of comparable dimensions could in practice reach a resolving power larger by a factor of at least one thousand than a conventional prism of comparable dimensions. That estimate is based on minimum, routinely available levels of temperature and magnetic field control. If more accurate temperature and magnetic field control is provided, the resolving power of the superconducting prism may be increased further.

The magneto-optic non-linearity of a transparent superconducting transmission optic is now discussed and an equivalent Kerr non-linearity is computed in order to compare the magnitude of the magneto-optic non-linearity in transparent superconducting elements to the electro-optic Kerr non-linearity of quantum dots and macroscopic non-linear optical elements.

Non-linear effects in quantum dot Kerr devices, and controlled phase shifts using quantum dots and continuous control beams have been described in Fushman et al., Science, 320:769, 2008.

In a Kerr medium, changes in refractive index $\Delta_K$ in response to an applied electric field E are calculated as $$\Delta_K = X^{(3)} E^2 \quad (23)$$

where $X^{(3)}$ is the third order non-linearity, also known as the Kerr constant. A Kerr constant as high as $X^{(3)}=2.4\times10^{-10}$ m$^2$V$^{-2}$ was recently reported (Fushman et al., Science, 320: 769, 2008) for a single quantum dot.

The peak electric field $E_C$ of a continuous control beam of intensity N (W/m$^2$) can be found as $N=\sqrt{\epsilon\epsilon_0/\mu\mu_0}E_c^2$ allowing us to calculate $\Delta_K$.

Figure 16:
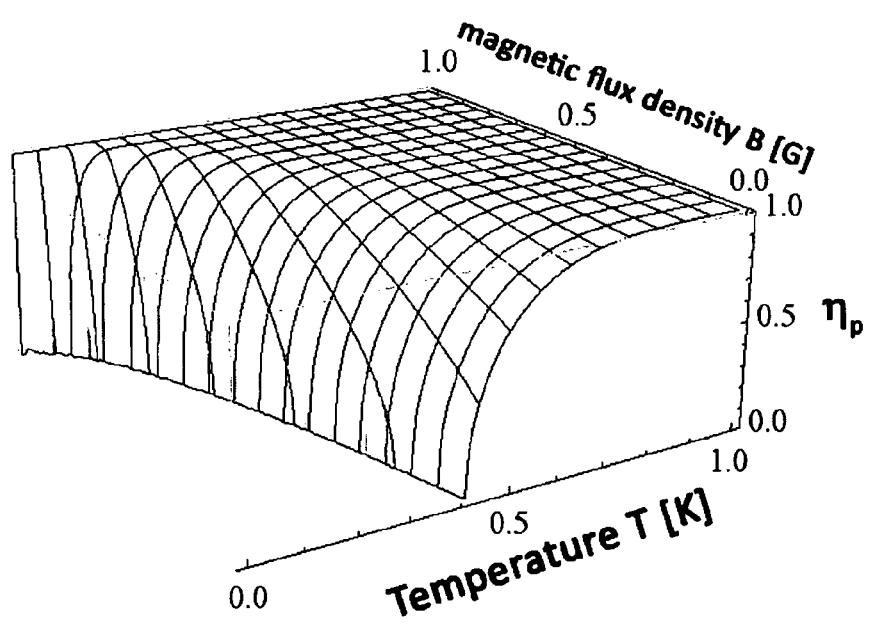
FIG. 16 is a graph of variation of refractive index of a transparent superconducting element with temperature and magnetic flux.

FIG. 16 shows the variation of refractive index $\eta_p$ of a transparent superconducting element with temperature and magnetic flux (plotted as fractions of the critical temperature and magnetic field). It can be seen that the refractive index of the transparent superconducting element at a given wavelength is highly non-linear in the H-T plane.

In order to compare the non-linearity of a transparent superconducting element to the Kerr non-linearity reported by Fushman et al we find the peak magnetic field of the control beam $$B_C = \frac{1}{v_P} E_C$$

where $v_p$ is the phase velocity of light in the propagating medium. We can now find the change of the phase refractive index in a transparent superconducting element $\Delta_{sc}(T_0, B_0)$ at a given temperature $T_0$ and field $B_0$ as:—

$$\Delta_{SC} = \eta_P(T_0, B_0 + B_C(N)) - \eta_P(T_0, B_0) \quad (24)$$

In order to make quantitative predictions about the change in refractive index to a given electromagnetic field it is necessary to specify the transparent superconducting element's carrier density $n_s^0$, its critical field $T_C$ and critical flux density $B_C$. In the following discussion we are using a transparent superconducting element with $n_s^0=3\times10^{27}$ m$^{-3}$, $T_c$=1.5K and $B_c$=101G.

Figure 17A:
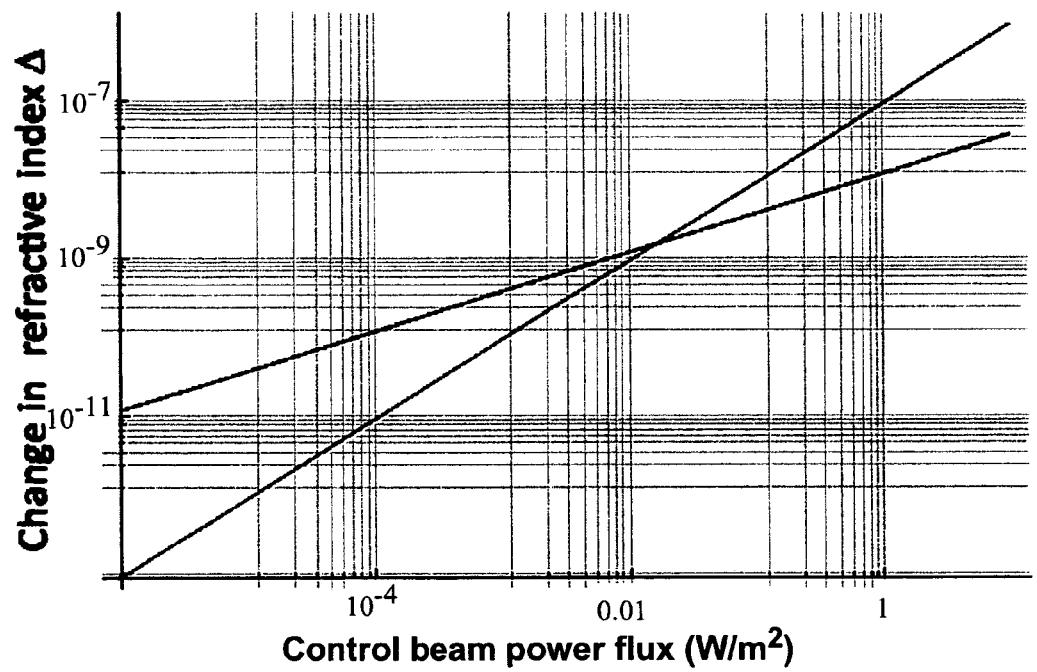
FIG. 17a is a graph of the variation with beam power of refractive index due to the Kerr effect, and variation in refractive index of a transparent superconducting element.
Figure 17B:
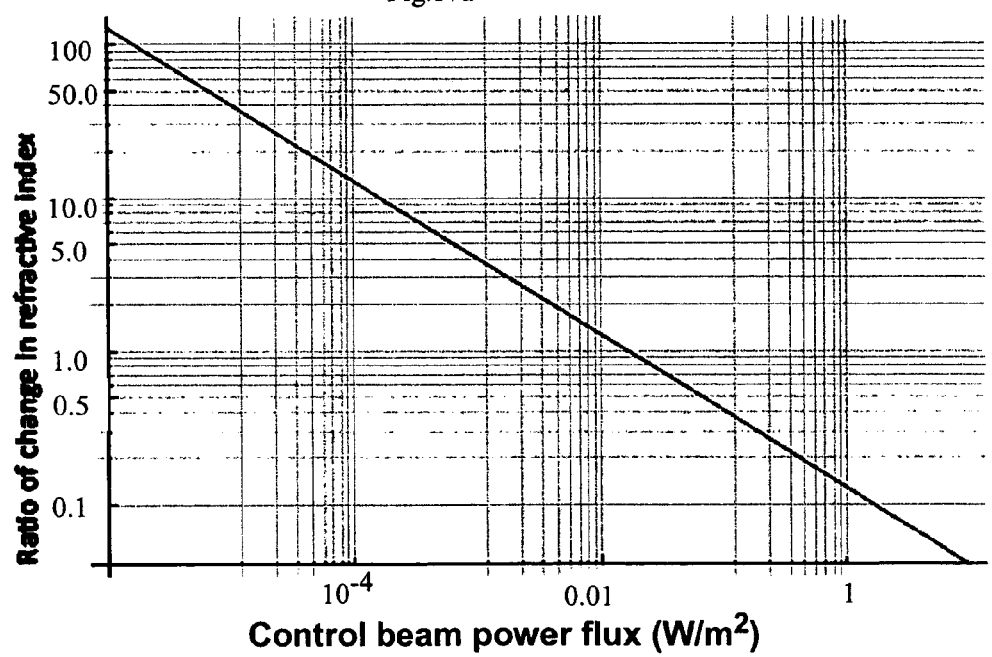
FIG. 17b is a graph of the ratio of change in refractive index as a function of control beam intensity.

The changes in refractive index $\Delta_K$ and $\Delta_{SC}$ have been plotted in FIG. 17a as a function of control beam intensity. The ratio of $\Delta_K$ and $\Delta_{SC}(T_0, B_0)$ has been plotted in FIG. 17b.

Figure 18:
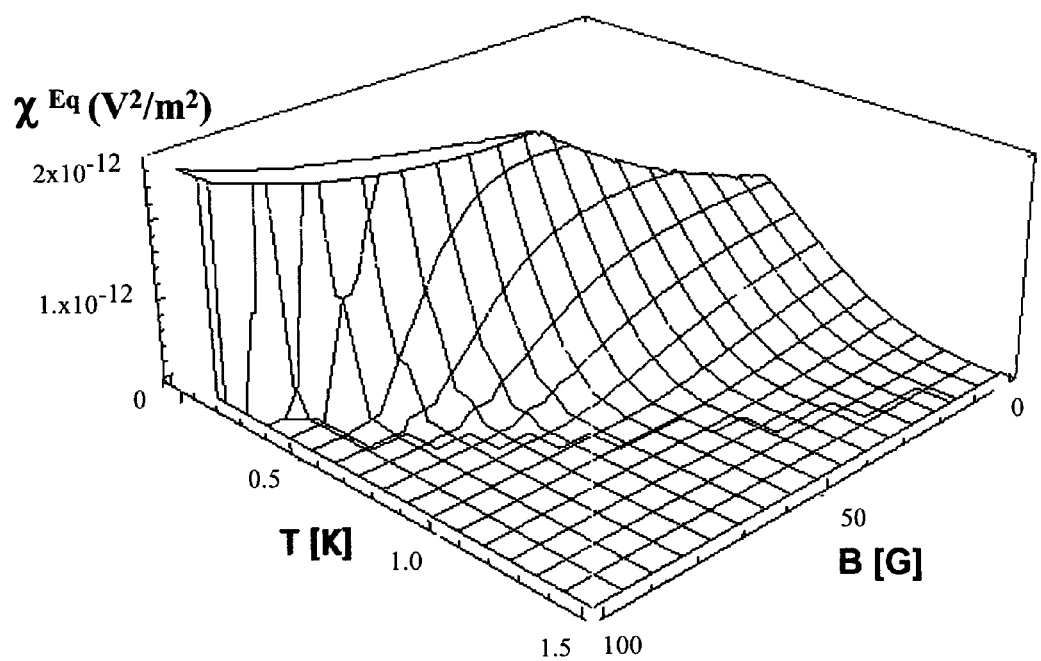
FIG. 18 is a graph of equivalent non-linearity of a transparent superconducting element as a function of temperature and applied magnetic flux density.

In order to facilitate comparison with experimental data, an equivalent non-linearity $\chi^{eq}=\Delta_{SC}/E_c^2$ has been calculated and plotted on the H-T plane in FIG. 18. A Kerr non-linearity of $\chi^{(3)}=\chi^{eq}$ will yield a change in refractive index $\Delta_K=\Delta_{SC}$ in the presence of a control beam of electric field $E_c$. It can be seen from FIG. 18 that $\chi^{eq}$ diverges along the line on the B-T plane for which $\lambda=\lambda_{crit}(B,T)$. As such, the maximum $\chi^{eq}$ for a perfectly monochromatic light source is only limited by the precisions of field and temperature control available.

It has thus been demonstrated that the optical properties of a transparent superconducting element can change in response to an applied magnetic field, and that for control beam intensities below 0.01 Wm$^{-2}$ the change in refractive index resulting from the non-linear response of a transparent superconducting element is larger than that of a single quantum dot system.

The non-linearity of transparent superconducting elements is a magneto-optic effect: the magnetic field B in the control beam reduces the number of electrons in the superconducting state, consequently reducing the critical wavelength $\lambda_{crit}$. In order to be able to compare the non-linearity of a transparent superconducting element to the Kerr effect in conventional macroscopic and microscopic systems, the equivalent non-linearity $\chi^{eq}=\Delta_{SC}/E_C^2$ has been introduced. The non-linearities of various systems are given in table 1. It can be seen that, at low control beam intensities, the transparent superconductor non-linearity is approximately six orders of magnitude larger than non-linearities obtained from macroscopic systems. It is, in fact, of similar magnitude as the single quantum dot system.

| System | Non-linearity $\chi$ (m$^2$/V$^2$) | Reference |
|---|---|---|
| Water | $9.4 \times 10^{-17}$ | Hecht |
| Nitrobenzene | $43.1 \times 10^{-17}$ | Hecht |
| Tropomyosin | $3000 \times 10^{-17}$ | Aragaon and Hahn |
| Single quantum dot | $2.4 \times 10^{-10}$ | Fushman et al |
| Transparent superconducting element | $0.7 \times 10^{-10}$ (for N = 1 W/m$^2$) | |

Hecht, Optics, Pearson Education, Inc., Addison Wesley, San Francisco, USA, 2002 Aragon and Hahn, Colloids and Surfaces B: Biointerfaces, 56: 19-25, 2007

Such ultrahigh non-linearities make applications such as self-focusing or Kerr mode locking and supercontinuum generation available to very low input beam intensities. Ultrahigh non-linearities in macroscopic transparent superconducting elements are also useful in optical computing and quantum logic gates.

The invention is not limited to the embodiments described herein. It will be understood that transparent superconducting material can be used as an optical element or in an optical apparatus in any suitable arrangement and can provide a variety of optical effects in the superconducting state. The optical effects can be selected or controlled by selecting the material and electronic properties of the transparent superconducting material, by selecting or controlling the physical parameters (for example, temperature, pressure and/or magnetic field) to which the transparent superconducting material is subject, and/or by selecting or controlling properties of electromagnetic radiation applied to the transparent superconducting material.

It will be understood that the invention has been described above purely by way of example, and modifications of detail can be made within the scope of the invention.

Each feature disclosed in the description, claims and (where appropriate) the drawings may be provided independently or in any appropriate combination.

The invention claimed is:

1. An optical element comprising transparent superconductor material formed so that in at least one region of the superconducting state, a superconducting critical wavelength is within a transparent band gap of the transparent superconductor material.

2. An optical element according to claim 1, wherein the transparent superconductor material is shaped to provide desired optical characteristics in the superconducting state.

3. An optical element according to claim 1, wherein the transparent superconductor material is formed to have at least one desired electronic property in the superconducting state.

4. An optical element according to claim 1, comprising a substrate, and having a layered structure.

5. An optical element according to claim 4, comprising a metallic layer in contact with the transparent superconductor material.

6. An optical element according to claim 1, wherein the transparent superconductor material comprises, or is formed from, a wide band gap semiconducting material.

7. An optical element according to claim 1, wherein the transparent superconductor material comprises, or is formed from, a metal oxide material.

8. An optical element according to claim 7, wherein the transparent superconductor material is selected from a group consisting of:
a titanium oxide material, a zinc oxide material, a cadmium oxide material, an indium oxide material, a tin oxide compound, a fluoro-oxide material, and a molybdenum oxide material.

9. An optical element according to claim 1, wherein the transparent superconductor material comprises intermetallic material.

10. An optical element according to claim 9, wherein the superconductor material comprises Indium Tin Oxide (ITO).

11. An optical element according to claim 1, wherein the optical element is a prism, lens, switch, beam-splitter, router, filter, etalon, interferometer, laser device, non-linear device or logic gate.

12. An optical element according to claim 1, wherein the optical element comprises:
an array of prisms each comprising transparent superconducting material.

13. An optical element according to claim 1, comprising:
at least two reflective layers, wherein the transparent superconducting material is positioned between the at least two reflective layers.

14. An optical element according to claim 1, comprising:
a resonant cavity, and the transparent superconducting material is positioned in the resonant cavity.

15. An optical element according to claim 2, wherein the transparent superconducting material is formed and arranged to provide a magneto-optic effect in the superconducting state.

16. An optical element according to claim 2, wherein the transparent superconductor material is formed and arranged to provide a medium for transmission of electromagnetic radiation.

17. An optical element according to claim 16 wherein the transparent superconducting element is formed and arranged to be operable in the superconducting state as a non-linear medium.

18. An optical element according to claim 2, wherein the transparent superconducting material is formed and arranged to be operable in the superconducting state as a Kerr medium.

19. Optical apparatus comprising:
at least one optical element according to formed of transparent superconductor material formed so that in at least one region of the superconducting state, a superconducting critical wavelength is within a transparent band gap of the transparent superconductor material.

20. Optical apparatus according to claim 19, comprising:
control means for controlling at least one property of the transparent superconductor material in a superconducting state.

21. Optical apparatus according to claim 20, comprising:
control means for controlling the superconducting charge carrier concentration of the transparent superconductor material of each optical element in the superconducting state.

22. Optical apparatus according to claim 20 wherein the control means is configured to control at least one of a refractive index and a dispersion of the transparent superconductor material.

23. Optical apparatus according to claim 20, wherein the control means is configured to control temperature of the transparent superconductor material and/or a magnetic field to which the transparent superconductor material is subject.

24. Optical apparatus according to claim 20, wherein the control means is configured to control pressure to which the transparent superconductor material is subject.

25. Optical apparatus according to claim 20, wherein the control means is configured to control whether electromagnetic radiation of a pre-determined wavelength or wavelengths is reflected, transmitted or absorbed.

26. Optical apparatus according to claim 20, wherein the control means is configured to control a path of electromagnetic radiation following interaction with the transparent superconductor material.

27. Optical apparatus according to claim 20, wherein the control means is configured to route received electromagnetic radiation to a pre-determined destination.

28. Optical apparatus according to claim 19, comprising:
a detector, for detecting electromagnetic radiation from the at least one optical element.

29. Optical apparatus according to claim 20, wherein the control means is configured to control both at least one property of electromagnetic radiation applied to the transparent superconductor material and the at least one property of the transparent superconductor material in the superconducting state thereby to provide a non-linear optical response.

30. Optical apparatus according to claim 20, wherein the control means is configured to control both at least one property of electromagnetic radiation applied to the transparent superconductor material and the at least one property of the transparent superconductor material in the superconducting state thereby to provide a non-linear and/or magneto-optic optical response to generate ultrashort light pulses, or to provide Kerr mode locking, or to provide self-focussing, or to provide super-continuum generation.

31. Optical apparatus according to claim 19, comprising:
means for applying electromagnetic radiation to at least one of the optical elements, wherein the means for applying electromagnetic radiation is configured to control applied electromagnetic radiation to be such that it alters a refractive index of the transparent superconductor material.

32. Optical apparatus according to claim 31, wherein the means for applying electromagnetic radiation is configured to apply electromagnetic radiation of at least a first intensity or a second intensity, and the electromagnetic radiation of second intensity has a magnetic field component that alters the refractive index of the transparent superconductor material such that the electromagnetic radiation of second intensity follows a different path to the electromagnetic radiation of first intensity following interaction with the transparent superconductor material.

33. Optical apparatus according claim 32, wherein the electromagnetic radiation of first intensity is reflected from the transparent superconductor material and the electromagnetic radiation of second intensity is transmitted by the transparent superconductor material.

34. Optical apparatus according to claim 19, comprising: one of:
a spectrometer; an optical router; an interferometer; a temperature, magnetic field or pressure sensor; an optical processor or computer; a laser; a laser line narrowing device; a filter; a beam splitter, a laser beam steerer; a customisable optical bench; a delay line; a non-linear device; an ultrashort light pulse generator; a Ken-mode locking device; a self-focussing device; a super-continuum generation device or a monochromator.

35. A delay device for delaying electromagnetic radiation comprising:
transparent superconductor material formed so that in at least one region of the superconducting state, a superconducting critical wavelength is within a transparent band gap of the transparent superconductor material; and
means for directing electromagnetic radiation through the transparent superconductor material.

* * * * *